US011045787B2

(12) United States Patent
Kobe et al.

(10) Patent No.: US 11,045,787 B2
(45) Date of Patent: *Jun. 29, 2021

(54) COMPOSITE GRANULES INCLUDING POLYMERIC SORBENT FOR ALDEHYDES

(71) Applicant: 3M INNOVATIVE PROPERTIES COMPANY, St. Paul, MN (US)

(72) Inventors: Michael W. Kobe, Lake Elmo, MN (US); Michael S. Wendland, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/081,479

(22) PCT Filed: Mar. 10, 2017

(86) PCT No.: PCT/US2017/021821
§ 371 (c)(1),
(2) Date: Aug. 31, 2018

(87) PCT Pub. No.: WO2017/160637
PCT Pub. Date: Sep. 21, 2017

(65) Prior Publication Data
US 2019/0060870 A1    Feb. 28, 2019

Related U.S. Application Data

(60) Provisional application No. 62/465,221, filed on Mar. 1, 2017, provisional application No. 62/465,214, filed on Mar. 1, 2017, provisional application No. 62/465,209, filed on Mar. 1, 2017, provisional application No. 62/307,831, filed on Mar. 14, 2016.

(51) Int. Cl.
| | |
|---|---|
| *B01J 20/26* | (2006.01) |
| *B01J 20/28* | (2006.01) |
| *C08L 1/02* | (2006.01) |
| *C08F 222/06* | (2006.01) |
| *C08F 212/08* | (2006.01) |
| *C08F 212/36* | (2006.01) |
| *B01D 53/14* | (2006.01) |
| *B01D 53/72* | (2006.01) |
| *B01J 20/30* | (2006.01) |

(52) U.S. Cl.
CPC ........ *B01J 20/261* (2013.01); *B01D 53/1456* (2013.01); *B01D 53/72* (2013.01); *B01J 20/265* (2013.01); *B01J 20/267* (2013.01); *B01J 20/2803* (2013.01); *B01J 20/28057* (2013.01); *B01J 20/3042* (2013.01); *B01D 2253/202* (2013.01); *B01D 2253/25* (2013.01); *B01D 2257/708* (2013.01); *B01J 2220/49* (2013.01); *C08F 212/08* (2013.01); *C08F 212/36* (2013.01); *C08F 222/06* (2013.01); *C08L 1/02* (2013.01)

(58) Field of Classification Search
None
See application file for complete search history.

(56) References Cited

U.S. PATENT DOCUMENTS

| | | | |
|---|---|---|---|
| 3,799,870 A | 3/1974 | Heilweil | |
| 4,029,597 A * | 6/1977 | Neisius | ................... C09B 62/45 |
| | | | 436/163 |
| 4,273,751 A | 6/1981 | Sinha | |
| 4,443,354 A | 4/1984 | Eian | |
| 4,588,537 A | 5/1986 | Klaase | |
| 4,677,096 A | 6/1987 | Van Der Smissen | |
| 4,798,575 A | 1/1989 | Siversson | |
| 4,798,850 A | 1/1989 | Brown | |
| 4,976,677 A | 12/1990 | Siversson | |
| 5,033,465 A | 7/1991 | Braun | |
| 5,081,111 A | 1/1992 | Akimoto | |
| 5,174,938 A | 12/1992 | Ito | |
| 5,389,175 A | 2/1995 | Wenz | |
| 5,496,507 A | 3/1996 | Angadjivand | |

(Continued)

FOREIGN PATENT DOCUMENTS

| | | |
|---|---|---|
| CN | 101035615 A | 9/2007 |
| GB | 1066480 | 4/1967 |

(Continued)

OTHER PUBLICATIONS

Arean, "Carbon dioxide and nitrogen adsorption on porous copolymers of divinylbenzene and acrylic acid", Adsorption, Apr. 2013, vol. 19, No. 2-4, pp. 367-372.
Bicak, "Aldehyde Separation by Polymer-Supported Oligo (ethyleneimines)", Journal of Polymer Science: Part A: Polymer Chemistry, Jul. 1997, vol. 35, No. 14, pp. 2857-2864, XP55027595.
Bottcher, "Silica Sol-Gel Glasses with Embedded Organic Liquids", Advanced Materials, Feb. 1999, vol. 11, No. 2, pp. 138-141.

(Continued)

*Primary Examiner* — Daniel Berns
(74) *Attorney, Agent, or Firm* — Jean A. Lown

(57) ABSTRACT

Composite granules that contain a binder and a polymeric sorbent material for capturing aldehydes such as formaldehyde are provided. Additionally, methods of making the composite granules, methods of using the composite granules to capture aldehydes, and compositions formed by reacting the composite granules with aldehydes are provided. The polymeric sorbent material included in the composite granules is a reaction product of a divinylbenzene/ maleic anhydride precursor polymeric material with a nitrogen-containing compound. This reaction results in the formation of nitrogen-containing groups that are covalently attached to the polymeric sorbent. Aldehydes can react with the nitrogen-containing groups.

15 Claims, No Drawings

(56) References Cited

U.S. PATENT DOCUMENTS

| | | | |
|---|---|---|---|
| 5,580,624 A | 12/1996 | Andersen | |
| 6,004,584 A | 12/1999 | Peterson | |
| 6,126,707 A | 10/2000 | Pitzen | |
| 6,391,429 B1 | 5/2002 | Senkus | |
| 6,432,872 B1 | 8/2002 | Tsushio et al. | |
| 6,534,611 B1* | 3/2003 | Darling | C08F 8/46 526/261 |
| 6,767,460 B1 | 7/2004 | Clough | |
| 6,930,219 B2 | 8/2005 | Shan | |
| 7,235,115 B2 | 6/2007 | Duffy | |
| 7,503,953 B2 | 3/2009 | Sundet | |
| 7,559,981 B2 | 7/2009 | Friday | |
| 7,947,142 B2 | 5/2011 | Fox | |
| 7,955,570 B2 | 6/2011 | Insley | |
| 8,240,484 B2 | 8/2012 | Fox | |
| 8,470,074 B2 | 6/2013 | Baugh | |
| 8,834,759 B2 | 9/2014 | Lalouch | |
| 9,776,131 B2 | 10/2017 | Eisenberger | |
| 10,654,026 B1 | 5/2020 | Wendland | |
| 2003/0064237 A1* | 4/2003 | Oishi | C08F 220/12 428/500 |
| 2003/0144421 A1* | 7/2003 | Dixon | B01J 20/285 525/193 |
| 2006/0042209 A1 | 3/2006 | Dallas et al. | |
| 2008/0319097 A1 | 12/2008 | Johannsen | |
| 2009/0060809 A1 | 3/2009 | Shioya | |
| 2009/0293279 A1 | 12/2009 | Sebastian | |
| 2012/0272829 A1 | 11/2012 | Fox | |
| 2012/0312734 A1 | 12/2012 | Kalayci et al. | |
| 2013/0048853 A1* | 2/2013 | Nunoshige | C08F 212/36 250/288 |
| 2013/0189166 A1 | 7/2013 | Thomas et al. | |
| 2014/0186250 A1 | 7/2014 | Levan | |
| 2015/0252566 A1 | 9/2015 | Tangeman | |
| 2015/0306536 A1 | 10/2015 | Billingsley | |
| 2016/0121320 A1 | 5/2016 | You | |
| 2017/0120219 A1* | 5/2017 | Diamond | B01J 23/52 |
| 2017/0333870 A1 | 11/2017 | Wendland | |
| 2018/0105628 A1 | 4/2018 | Wendland | |
| 2019/0054447 A1* | 2/2019 | Kobe | B01J 20/28057 |
| 2019/0060870 A1 | 2/2019 | Kobe | |

FOREIGN PATENT DOCUMENTS

| | | |
|---|---|---|
| JP | 63154766 A2 | 6/1988 |
| JP | 1094994 A2 | 4/1989 |
| JP | 3083946 A2 | 4/1991 |
| JP | 8117539 A2 | 5/1996 |
| JP | 2015-226867 | 12/2015 |
| TW | 201509526 A | 3/2015 |
| WO | WO 00/25616 | 5/2000 |
| WO | 2002/086039 A | 10/2002 |
| WO | 2006/052694 | 5/2006 |
| WO | WO 2011/035195 | 3/2011 |
| WO | WO 2015/034799 | 3/2015 |
| WO | WO 2015/095110 | 6/2015 |
| WO | WO 2015/095115 | 6/2015 |
| WO | 2016/011038 | 1/2016 |
| WO | WO 2016/186858 | 11/2016 |
| WO | WO 2016/205083 | 12/2016 |
| WO | WO 2016/205444 | 12/2016 |
| WO | WO 2017/106434 | 6/2017 |
| WO | WO 2017/106438 | 6/2017 |
| WO | WO 2017/106443 | 6/2017 |
| WO | WO 2017/160650 | 9/2017 |
| WO | WO 2018/089870 | 5/2018 |
| WO | WO 2018/089877 | 5/2018 |

OTHER PUBLICATIONS

Carta, "Novel Spirobisindanes for Use as Precursors to Polymers of Intrinsic Microporosity", Organic Letters, 2008, vol. 10, No. 13, pp. 2641-2643.

Cecile, "Hydrophilic Polystyrene/Maleic Anhydride Ultrafine Fibrous Membranes", Journal of Applied Polymer Science, Jan. 2010, vol. 115, No. 2, pp. 723-730.

Chen, "Stability and Equilibrium Properties of Macroreticular Resins for Flue Gas Desulfurization", Industrial and Engineering Chemistry Research, 1990, vol. 29, No. 3, pp. 440-447, XP055356157.

Chowdhury, "Synthesis and characterization of radiation grafted films for removal of arsenic and some heavy metals from contaminated water", Radiation Physics and Chemistry, Oct. 2012, vol. 81, No. 10, pp. 1606-1611.

Croll, "Formation of Tectocapsules by Assembly and Cross-linking of Poly(divinylbenzene-a/t-maleic anhydride) Spheres at the Oil-Water Interface", Langmuir, May 2003, vol. 19, No. 14, pp. 5918-5922, XP055355244.

Gorka, "KOH activation of mesoporous carbons obtained by soft-templating", Carbon, Jul. 2008, vol. 46, No. 8, pp. 1159-1161.

Harada, "Removal of primary and secondary amines by reaction gas chromatography using porous maleic anhydride-divinylbenzene copolymer beads", Kumamoto University, Jul. 1982, vol. 31, pp. 697-701.

Kaliva, "Microporous Polystyrene Particles for Selective Carbon Dioxide Capture", Langmuir, Feb. 2012, vol. 28, No. 5, pp. 2690-2695.

Niu, "Highly dispersed Ru on K-doped meso-macroporous $SiO_2$ for the preferential oxidation of CO in $H_2$-rich gases", International Journal of Hydrogen Energy, 2014, vol. 39, No. 25, pp. 13800-13807.

Ogawa, "Preparation of Spherical Polymer Beads of Maleic Anhydride-Styrene-Divinylbenzene and Metal Sorption of its Derivatives", Journal of Applied Polymer Science, 1984, vol. 29, No. 9, pp. 2851-2856.

Okay, "Porous Maleic Anhydride-Styrene-Divinylbenzene Copolymer Beads", Journal of Applied Polymer Science, Jul. 1987, vol. 34, pp. 307-317, XP055356037.

Song, "Coordination of Metal Cations with Amino-Functionalized MCM-41 for Adsorptive Desulfurization", Advanced Materials Research, 2014, vols. 926-930, pp. 4222-4225.

Woodward, "Swellable, Water- and Acid-Tolerant Polymer Sponges for Chemoselective Carbon Dioxide Capture", Journal of the American Chemical Society, 2014, vol. 136, No. 25, pp. 9028-9035.

Yan, "In situ growth of a carbon interphase between carbon fibres and a polycarbosilane-derived silicon carbide matrix", Carbon, 2011, vol. 49, No. 8, pp. 2869-2877.

Yang, "A Pervaporation Study of Ammonia Solutions Using Molecular Sieve Silica Membranes", Membranes, 2014, vol. 4, No. 1, pp. 40-54.

Yim, "Removal of Formaldehyde Over Amine Functionalized SBA-15", Journal of Nanoscience and Nanotechnology, 2011, vol. 11, No. 2, pp. 1714-1717.

International Search Report for PCT International Application No. PCT/US2017/21821, dated Jun. 7, 2017, 3 pages.

* cited by examiner

COMPOSITE GRANULES INCLUDING POLYMERIC SORBENT FOR ALDEHYDES

CROSS REFERENCE TO RELATED APPLICATIONS

This application is a national stage filing under 35 U.S.C. 371 of PCT/US2017/021821, filed Mar. 10, 2017, which claims the benefit of U.S. Provisional Patent Application Nos. 62/307,831, filed Mar. 14, 2016; 62/465,214 filed Mar. 1, 2017; 62/465,209, filed Mar. 1, 2017; and 62/465,221, filed Mar. 1, 2017, the disclosures of which are incorporated by reference herein in their entireties.

TECHNICAL FIELD

Composite granules are provided that contain a polymeric sorbent material for aldehydes.

BACKGROUND

Formaldehyde is a known carcinogen and allergen. For this reason, the Occupational Safety and Health Administration (OSHA) in the United States has set an eight hour exposure limit of 0.75 parts per million and a 15 minute exposure limit of 2 parts per million for formaldehyde vapor. In spite of its toxicity, formaldehyde is a high volume industrial compound. It is used, for example, to prepare a number of polymeric materials that find widespread use in various building materials including foam insulation, particle board, carpet, paint, and varnish. Out-gassing of residual formaldehyde from these building materials makes formaldehyde one of the most prevalent indoor air pollutants. Formaldehyde is also a by-product of the combustion of organic materials. As a result, formaldehyde is a common outdoor pollutant as well arising from automobile exhaust, methane combustion, forest fires, and cigarette smoke.

While in North America strict formaldehyde out-gassing limitations are placed on building materials, this is not the case in all parts of the world. In some Asian countries, for example, few restrictions are placed on building materials. Combined with an increased use of biofuels to heat homes and to run automobiles, dangerous levels of formaldehyde vapor may occur in both indoor and outdoor air. For this reason, there is an immediate need for solutions to mitigate human exposure to formaldehyde vapor both as an indoor and an outdoor air pollutant.

The high volatility of formaldehyde (it is a gas at room temperature) makes it extremely difficult to capture by the mechanism of physisorption alone. Because formaldehyde is reactive, however, it can be more readily captured through chemisorption. With chemisorption, the formaldehyde vapors are captured by chemically reacting with the sorbent itself or with chemicals impregnated in the sorbent. Thus, the key to making high capacity sorbents for formaldehyde is to provide a sorbent with many reactive sites for formaldehyde.

One typical sorbent material that has been used for capturing formaldehyde is based on activated carbon scaffolds. The scaffold of activated carbon, however, is relatively inactive and this inactivity makes it difficult to incorporate a high density of reactive groups into the activated carbon scaffold itself. For this reason, most of the efforts in making sorbents for formaldehyde have been focused on finding impregnation chemistries that can react with formaldehyde. Thus, the activated carbon scaffolds are typically impregnated with various chemistries to react with formaldehyde. The two most common impregnation chemistries used for formaldehyde capture are the sodium salt of sulfamic acid and ethylene urea co-impregnated with phosphoric acid. Various other metal salts have been used as well.

Impregnation, in general, has some drawbacks for making sorbents. First, impregnation chemistries can migrate and this is problematic especially if other sorbents are used in the same product. Another disadvantage to impregnation is that it removes activated carbon's capacity for adsorbing volatile organic compounds (VOCs). The impregnation chemistry occupies the pores of the activated carbon thus reducing the surface area available to capture non-reactive vapors that are captured by physisorption only.

Sorbent materials for aldehydes are still needed.

SUMMARY

Composite granules that contain polymeric sorbent materials for capturing aldehydes such as formaldehyde are provided. Additionally, methods of making the composite granules, methods of using the composite granules to capture aldehydes, and compositions formed by reacting the composite granules with aldehydes are provided. The polymeric sorbent included in the composite granules has covalently attached nitrogen-containing groups that react with aldehyde compounds.

In a first aspect, composite granules are provided. The composite granules include a binder and a polymeric sorbent that is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group (—$NH_2$), or a compound having at least two amino groups of formula —NHR where R is hydrogen or alkyl.

In a second aspect, a method of sorbing (i.e., capturing) an aldehyde is provided. The method includes providing composite granules that contain a binder and a polymeric sorbent as described above. The method further includes exposing the composite granules to an aldehyde and sorbing the aldehyde on the polymeric sorbent. The aldehyde is of Formula (I)

$$R_2\text{—(CO)—H} \qquad (I)$$

where $R_2$ is hydrogen, alkyl, vinyl, or aryl. The molecular weight of the aldehyde of Formula (I) is typically no greater than 200 grams/mole.

In a third aspect, a composition comprising a reaction product of an aldehyde and composite granules is provided. The composite granules contain a binder and a polymeric sorbent as described above. The aldehyde is of Formula (I)

$$R_2\text{—(CO)—H} \qquad (I)$$

where $R_2$ is hydrogen, alkyl, vinyl, or aryl. The molecular weight of the aldehyde of Formula (I) is typically no greater than 200 grams/mole.

In a fourth aspect, a method of preparing composite granules is provided. The method includes providing a precursor polymeric material. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The method further includes reacting the precursor polymeric material with a nitrogen-containing compound that is selected from ammonia, a compound having a single primary amino group (—$NH_2$), or a compound having at least two amino groups of formula —NHR where R is hydrogen or alkyl. The reaction results in the formation of the polymeric sorbent having a covalently attached nitrogen-containing group. The method still further includes blending the polymeric sorbent with a binder to form a blended material and preparing the composite granules from the blended material.

DETAILED DESCRIPTION

Composite granules that contain a binder and a polymeric sorbent material for capturing aldehydes such as formaldehyde are provided. Additionally, methods of making the composite granules, methods of using the composite granules to capture aldehydes, and compositions formed by reacting the composite granules with aldehydes are provided. The polymeric sorbent material included in the composite granules are a reaction product of a divinylbenzene/maleic anhydride precursor polymeric material with a nitrogen-containing compound. The resulting polymeric sorbent has covalently attached nitrogen-containing groups. The polymeric sorbents typically are porous; the pores of the polymeric sorbent are often in the size range of mesopores and/or micropores.

More particularly, the polymeric sorbents within the composite granules are a reaction product of a divinylbenzene/maleic anhydride precursor polymeric material with a nitrogen-containing compound. The resulting polymeric sorbent has covalently attached nitrogen-containing groups. The polymeric sorbent can be used to sorb aldehydes that are volatile at room temperature or under use conditions. Suitable aldehydes are typically of Formula (I)

$$R_2—(CO)—H \qquad (I)$$

where $R_2$ is hydrogen, alkyl, vinyl, or aryl. The molecular weight of the aldehyde of Formula (I) is typically no greater than 200 grams/mole. In some embodiments, the aldehyde is formaldehyde ($R_2$ is hydrogen) or acetaldehyde ($R_2$ is methyl).

Terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The term "and/or" means either or both. For example "A and/or B" means only A, only B, or both A and B.

The recitations of numerical ranges by endpoints include all numbers subsumed within that range as well as the endpoints (e.g., 1 to 5 includes 1, 1.5, 2, 2.75, 3, 3.80, 4, 5, etc.).

The term "in the range" or "within a range" (and similar statements) includes the endpoints of the stated range.

The terms "polymer" and "polymeric material" are used interchangeably and refer to materials formed by reacting one or more monomers. These terms include homopolymers, copolymers, terpolymers, or the like. Likewise, the terms "polymerize" and "polymerizing" refer to the process of making a polymeric material that can be a homopolymer, copolymer, terpolymer, or the like.

The terms "polymeric sorbent" and "porous polymeric sorbent" are used interchangeably to refer to a polymeric material that is porous and that can sorb gaseous substances such as, for example, aldehydes. Porous materials such as the polymeric sorbents can be characterized based on the size of their pores. The term "micropores" refers to pores having a diameter less than 2 nanometers. The term "mesopores" refers to pores having a diameter in a range of 2 to 50 nanometers. The term "macropores" refers to pores having a diameter greater than 50 nanometers. The porosity of a polymeric sorbent can be characterized from an adsorption isotherm of an inert gas such as nitrogen or argon by the porous material under cryogenic conditions (e.g., liquid nitrogen at 77 K). The adsorption isotherm is typically obtained by measuring adsorption of the inert gas such as argon by the porous polymeric sorbent at multiple relative pressures in a range of about $10^{-6}$ to about 0.98±0.01. The isotherms are then analyzed using various methods such as the BET (Brunauer-Emmett-Teller) method to calculate specific surface area and such as Density Functional Theory (DFT) to characterize the porosity and the pore size distribution.

The term "sorbing" and similar words such as "sorb", "sorbed", and "sorption" refer to the addition of a first substance (e.g., a gas such as an aldehyde) to a second substance (e.g., a polymeric material such as the porous polymeric sorbent) by adsorbing, absorbing, or both. Likewise, the term "sorbent" refers to a second substance that sorbs a first substance by adsorbing, absorbing, or both. The sorbent can interact with the first substance being sorbed by physisorption, chemisorption, or both.

The term "polymerizable composition" includes all materials included in the reaction mixture used to form the polymeric material. The polymerizable composition includes, for example, the monomer mixture, the organic solvent, the initiator, and other optional components. Some of the components in the polymerizable composition such as the organic solvent may not undergo a chemical reaction but can influence the chemical reaction and the resulting polymeric material.

The term "monomer mixture" refers to that portion of a polymerizable composition that includes the monomers. More specifically, as used herein, the monomer mixture includes at least divinylbenzene and maleic anhydride.

The terms "divinylbenzene/maleic anhydride polymeric material" and "divinylbenzene/maleic anhydride precursor polymeric material" are used interchangeably and refer to a polymeric material prepared from divinylbenzene, maleic anhydride, and optionally a styrene-type monomer.

The term "styrene-type monomer" refers to styrene, an alkyl-substituted styrene (e.g., ethyl styrene), or mixtures thereof. These monomers are often present in divinylbenzene as impurities.

The term "surface area" refers to the total area of a surface of a material including the internal surfaces of accessible pores. The surface area is typically calculated from adsorption isotherms obtained by measuring the amount of an inert gas such as nitrogen or argon that adsorbs on the surface of a material under cryogenic conditions (e.g., liquid nitrogen at 77 K) over a range of relative pressures. The term "BET specific surface area" "$SA_{BET}$" is the surface area per gram of a material (typically, $m^2$/gram) that is usually calculated from adsorption isotherm data of the inert gas over a relative pressure range of 0.05 to 0.30 using the BET method.

The term "composite granule" refers to a plurality of polymeric sorbent particles held together by a binder. The composite granules have an average granule size (i.e., the largest dimension of a granule, which is the diameter if the granule is spherical) of at least 30 microns. In certain embodiments, the granule size is at least 100 microns. In certain embodiments, the granule size is up to 30,000 microns or greater, up to 25,000 microns, up to 20,000 microns, up to 10,000 microns, up to 5,000 microns, or up to 2,500 microns.

The term "room temperature" refers to a temperature in a range of 20° C. to 30° C., in a range of 20° C. to 25° C., in a range close to and including 25° C., or 25° C.

Composite granules are provided for capture of aldehyde compounds. The polymeric sorbent and/or the precursor of the polymeric sorbent included in the composite granules is often prepared in a pressurized reactor as a single block of polymeric material. This block of polymeric material is then broken up and crushed into fine particles using a rotary hammer mill. Typical mills include a screen to help control the particle size by keeping all crushed particles smaller than the size of the holes in the screen. During the crushing and milling of the polymeric material, a significant amount of fine particles are produced that can be too small for use in some applications such as filtration applications. For example, as much as one third of the polymeric material that is crushed and milled can be too small for use in certain filtration applications. What is considered to be too small can vary depending on the particular application and on the allowable pressure drop.

The fine particles of the polymeric material can be formed into larger particles (i.e., composite granules) by combination with a binder. The composite granules typically have a size that is suitable for use in filtration application. Thus, formation of the composite granules allows full use of all of the polymeric material formed within the reactor and thereby reduces the overall production costs of the polymeric sorbent.

Furthermore, some processes for making articles (e.g., filtration articles) containing the polymeric sorbents can result in the formation of additional fine particles. For example, making polymeric sorbent loaded webs, loading respirator cartridges, and ultrasonic welding of respirators and respirator cartridges can lead to pulverization of the polymeric sorbent materials resulting in the formation of fine particles. Providing polymeric sorbents in a form that reduces pulverization can be beneficial from a processing perspective. It has been found that combining the polymeric sorbent with a binder can result in the formation of composite granules with improved toughness (e.g., less likely to crumble apart) compared to polymeric sorbent in the absence of a binder. In addition, the composite granules of the present disclosure can be produced without negatively impacting the ability of the polymeric sorbent to sorb aldehyde compounds to such an extent that the composite granules are not useful as sorbents.

Polymeric Sorbent

The polymeric sorbent that is included in the composite granules is formed by reacting a precursor polymeric material with a nitrogen-containing compound. The precursor polymeric material is formed from divinylbenzene, maleic anhydride, and an optional styrene-type monomer. The precursor polymeric material can be referred to as a divinylbenzene/maleic anhydride polymeric material. The conditions used to synthesize the precursor polymeric material are selected to produce a polymeric sorbent that has a BET specific surface area equal to at least 25 $m^2$/gram. The nitrogen-containing compound reacts with an anhydride group in the precursor polymeric material. This reaction results in the formation of a covalent bond linking a nitrogen-containing group to the polymeric material. That is, the polymeric sorbent contains covalently attached nitrogen-containing groups.

More specifically, the precursor polymeric material (i.e., the divinylbenzene/maleic anhydride polymeric material) is synthesized from a polymerizable composition that includes a monomer mixture containing maleic anhydride, divinylbenzene, and an optional styrene-type monomer. The monomer mixture used to form the precursor polymeric material contains (1) 8 to 65 weight percent maleic anhydride, (2) 30 to 85 weight percent divinylbenzene, and (3) 0 to 40 weight percent of a styrene-type monomer, wherein the styrene-type monomer is styrene, an alkyl-substituted styrene, or a combination thereof. The amounts are based on the total weight of monomers in the monomer mixture, which is equal to the total weight of monomers in the polymerizable composition. When the precursor polymeric material is used to form a polymeric sorbent that is particularly effective for sorption of aldehydes, the monomer mixture often contains (1) 15 to 65 weight percent maleic anhydride, (2) 30 to 85 weight percent divinylbenzene, and (3) 0 to 40 weight percent of a styrene-type monomer, wherein the styrene-type monomer is styrene, an alkyl-substituted styrene, or a combination thereof.

The maleic anhydride that is included in the monomer mixture results in the formation of maleic anhydride monomeric units of Formula (II) within the precursor polymeric material.

The asterisks in this formula and other formulas contained herein denote the location of attachment of the monomeric unit to another monomeric unit or to a terminal group.

The amount of maleic anhydride used to form the precursor polymeric material influences the amount of nitrogen-containing compound that can react with the precursor polymeric material to form the polymeric sorbent. The nitrogen-containing compound reacts with the anhydride group to become covalently attached to the polymeric material that is the polymeric sorbent.

In some embodiments, the amount of maleic anhydride included in the monomer mixture is at least 8 weight percent, at least 10 weight percent, at least 12 weight percent, at least 15 weight percent, or at least 20 weight percent. The amount of maleic anhydride can be up to 65 weight percent, up to 60 weight percent, up to 55 weight percent, up to 50 weight percent, up to 45 weight percent, up to 40 weight percent, up to 35 weight percent, up to 30 weight percent, or up to 25 weight percent. For example, the maleic anhydride may be present in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (II) in a range of 8 to 65 weight percent, 15 to 65 weight percent, 15 to 60 weight percent, 15 to 50 weight percent, 15 to 40 weight percent, 20 to 65 weight percent, 20 to 60 weight percent, 20 to 50 weight percent, 20 to 40 weight percent, 30 to 65 weight percent, 30 to 60 weight percent, 30 to 50 weight percent, 40 to 65 weight percent, or 40 to 60 weight percent. These amounts are based on the total weight of the monomeric units in the precursor polymeric material.

The divinylbenzene included in the monomer mixture results in the formation of divinylbenzene monomeric units of Formula (III) within the precursor polymeric material.

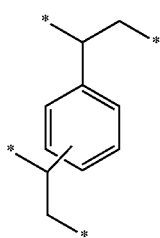

(III)

The two groups attached to the benzene ring can be in an ortho, meta, or para arrangement to each other. The monomeric units of Formula (III) contribute to the high crosslink density and to the formation of a rigid polymeric material having micropores and/or mesopores.

The amount of divinylbenzene used to form the precursor polymeric material can have a strong influence on the BET specific surface area of both the precursor polymeric material and the polymeric sorbent. The BET specific surface area tends to increase with an increase in the amount of divinylbenzene in the monomer mixture used to form the precursor polymeric material and with the resulting amount of monomeric units of Formula (III) in the polymeric sorbent. If the amount of divinylbenzene is less than 30 weight percent, the polymeric sorbent may not have a sufficiently high BET specific surface area. On the other hand, if the amount of divinylbenzene is greater than 85 weight percent, the amount of aldehyde sorbed may be compromised because there are fewer nitrogen-containing groups in the polymeric sorbent. In some embodiments, the amount of divinylbenzene included in the monomer mixture is at least 30 weight percent, at least 35 weight percent, at least 40 weight percent, or at least 45 weight percent. The amount of divinylbenzene can be up to 85 weight percent, up to 80 weight percent, up to 75 weight percent, up to 70 weight percent, up to 65 weight percent, up to 60 weight percent, or up to 50 weight percent. For example, the amount can be in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. The amounts are based on the total weight of monomers in the monomer mixture contained in the polymerizable composition used to form the precursor polymeric material.

Stated differently, the precursor polymeric material contains monomeric units of Formula (III) in a range of 30 to 85 weight percent, 30 to 80 weight percent, 30 to 75 weight percent, 30 to 70 weight percent, 30 to 65 weight percent, 30 to 60 weight percent, 30 to 55 weight percent, 30 to 50 weight percent, 35 to 80 weight percent, 35 to 70 weight percent, 35 to 60 weight percent, 40 to 85 weight percent, 40 to 80 weight percent, 40 to 70 weight percent, or 40 to 60 weight percent. These amounts are based on the total weight of the monomeric units in the precursor polymeric material.

Divinylbenzene can be difficult to obtain in a pure form. For example, divinylbenzene is often commercially available with purity as low as 55 weight percent. Obtaining divinylbenzene with purity greater than about 80 weight percent can be difficult and/or expensive. The impurities accompanying divinylbenzene are typically styrene-type monomers such as styrene, alkyl-substituted styrene (e.g., ethyl styrene), or mixtures thereof. Thus, styrene-type monomers are often present along with divinylbenzene and maleic anhydride in the monomer mixture contained in the polymerizable composition used to form the precursor polymeric material. The monomer mixture typically contains 0 to 40 weight percent styrene-type monomers based on the total weight of monomers in the monomer mixture. If the content of the styrene-type monomer is greater than 40 weight percent, the crosslink density may be too low and/or the distance between crosslinks may be too large to provide a polymeric sorbent with the desired BET specific surface area (e.g., at least 25 $m^2$/grams). As the crosslink density decreases, the polymeric sorbent tends to be less rigid and less porous. Typically, divinylbenzene having a purity of 55 weight percent is not suitable for use in the monomer mixtures used to form the precursor polymeric material because the content of styrene-type monomer impurities is too high. That is, to provide a monomer mixture having a suitable amount of divinylbenzene, the divinylbenzene often is at least about 80 weight percent pure. Using divinylbenzene having a lower purity than about 80 weight percent can result in the formation of a precursor polymeric material and/or a polymeric sorbent with an undesirably low BET specific surface area.

The styrene-type monomers included in the monomer mixture result in the presence of styrene-type monomeric units of Formula (IV) within the precursor polymeric material.

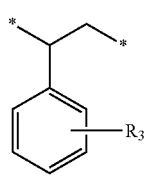

(IV)

Group $R_3$ is hydrogen or alkyl (e.g., an alkyl having 1 to 10 carbon atoms, 1 to 6 carbon atoms or 1 to 4 carbon atoms).

In some embodiments, the amount of styrene-type monomers used to form the precursor polymeric material, is at least 1 weight percent, at least 2 weight percent, or at least 5 weight percent. The amount of styrene-type monomers can be up to 40 weight percent, up to 30 weight percent, up to 20 weight percent, or up to 10 weight percent. For example, the amount can be in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. The amounts are based on the total weight of monomers in the monomer mixture contained in the polymerizable composition used to form the precursor polymeric material.

Stated differently, the precursor polymeric material contains monomeric units of Formula (IV) in a range of 0 to 40 weight percent, 1 to 40 weight percent, 5 to 40 weight percent, 10 to 40 weight percent, 0 to 30 weight percent, 1 to 30 weight percent, 5 to 30 weight percent, 10 to 30 weight percent, 0 to 20 weight percent, 1 to 20 weight percent, 5 to 20 weight percent, or 10 to 20 weight percent. These amounts are based on the total weight of the monomeric units in the precursor polymeric material.

Overall, the precursor polymeric material is formed from a polymerizable composition containing a monomer mixture that includes 8 to 65 weight percent maleic anhydride, 30 to 85 weight percent divinylbenzene, and 0 to 40 weight percent of a styrene-type monomer. In some embodiments, the monomer mixture contains 15 to 65 weight percent maleic anhydride, 30 to 85 weight percent divinylbenzene, and 0 to 40 weight percent (or 5 to 40 weight percent) of a styrene-type monomer. Some embodiments contain 25 to 65 weight percent maleic anhydride, 30 to 75 weight percent divinylbenzene, and 1 to 20 weight percent (or 5 to 20 weight percent) styrene-type monomer. Some embodiments contain 25 to 60 weight percent maleic anhydride, 30 to 75 weight percent divinylbenzene, and 1 to 30 weight percent (or 5 to 30 weight percent or 10 to 30 weight percent) styrene-type monomer. In still other embodiments, the monomer mixture contains 30 to 65 weight percent maleic anhydride, 30 to 70 weight percent divinylbenzene, and 1 to 20 weight percent (or 5 to 20 weight percent or 10 to 20 weight percent) styrene-type monomer. In still other embodiments, the monomer mixture contains 30 to 60 weight percent maleic anhydride, 30 to 65 weight percent divinylbenzene, and 1 to 20 weight percent (or 5 to 20 weight percent or 10 to 20 weight percent) styrene-type monomer. In further embodiments, the monomer mixture contains 40 to 60 weight percent maleic anhydride, 30 to 55 weight percent divinylbenzene, and 1 to 20 weight percent (or 5 to 20 weight percent, or 10 to 20 weight percent) styrene-type monomers. In still further embodiments, the monomer mixture contains 20 to 40 weight percent maleic anhydride, 50 to 70 weight percent divinylbenzene, and 1 to 20 weight percent (or 5 to 20 weight percent or 10 to 20 weight percent) styrene-type monomer. The weight percent values are based on the total weight of monomers in the monomer mixture used to form the precursor polymeric material.

The monomer mixture included in the polymerizable composition used to form the precursor polymeric material typically contains at least 95 weight percent monomers selected from maleic anhydride, divinylbenzene, and styrene-type monomer. For example, at least 97 weight percent, at least 98 weight percent, at least 99 weight percent, at least 99.5 weight percent, at least 99.9 weight percent, or 100 weight percent of the monomers in the monomer mixture are selected from maleic anhydride, divinylbenzene, and styrene-type monomer. In some embodiments, where high purity divinylbenzene is used, the monomer mixture contains only divinylbenzene and maleic anhydride. That is, the sum of the amount of divinylbenzene and maleic anhydride is 100 weight percent.

In addition to the monomer mixture, the polymerizable composition used to form the precursor polymeric material includes an organic solvent. The polymerizable composition is a single phase prior to polymerization. Stated differently, prior to polymerization, the polymerizable composition is not a suspension. The organic solvent is selected to dissolve the monomers included in the monomer mixture and to solubilize the precursor polymeric material as it begins to form. The organic solvent typically includes a ketone, ester, acetonitrile, or mixture thereof.

The organic solvent can function as a porogen during the formation of the precursor polymeric material. The organic solvent choice can strongly influence the BET specific surface area and the size of the pores formed in the precursor polymeric material. Using organic solvents that are miscible with both the monomers and the forming polymer tends to result in the formation of micropores and mesopores within the precursor polymeric material. Good solvents for the monomers and the forming polymer tend to result in a larger fraction of the porosity of the final polymeric sorbent being in the form of micropores and mesopores.

Organic solvents that are particularly suitable include ketones, esters, acetonitrile, and mixtures thereof. Provided that the resulting precursor polymeric material has a BET specific surface area equal to at least 100 $m^2$/gram, other organic solvents can be added along with one or more of these organic solvents. Examples of suitable ketones include, but are not limited to, alkyl ketones such as methyl ethyl ketone and methyl isobutyl ketone. Examples of suitable esters include, but are not limited to, acetate esters such as ethyl acetate, propyl acetate, butyl acetate, amyl acetate, and tert-butyl acetate.

The organic solvent can be used in any desired amount. The polymerizable compositions often have percent solids in a range of 1 to 75 weight percent (i.e., the polymerizable composition contains 25 to 99 weight percent organic solvent). If the percent solids are too low, the polymerization time may become undesirably long. The percent solids are often at least 1 weight percent, at least 2 weight percent, at least 5 weight percent, at least 10 weight percent, or at least 15 weight percent. If the weight percent solids is too great, however, the monomers do not form a single phase with the organic solvent. Further, increasing the percent solids tends to result in the formation of precursor polymeric material with a lower BET specific surface area. The percent solids can be up to 75 weight percent, up to 70 weight percent, up to 60 weight percent, up to 50 weight percent, up to 40 weight percent, up to 30 weight percent, or up to 25 weight percent. For example, the percent solids can be in a range of 5 to 75 weight percent, 5 to 70 weight percent, 5 to 60 weight percent, 5 to 50 weight percent, 5 to 40 weight percent, 5 to 30 weight percent, or 5 to 25 weight percent.

In addition to the monomer mixture and organic solvent, the polymerizable compositions used to form the precursor polymeric material typically include an initiator for free radical polymerization reactions. Any suitable free radical initiator can be used. Suitable free radical initiators are typically selected to be miscible with the monomers included in the polymerizable composition. In some embodiments, the free radical initiator is a thermal initiator that can be activated at a temperature above room temperature. In other embodiments, the free radical initiator is a redox initiator. Because the polymerization reaction is a free radical reaction, it is desirable to minimize the amount of oxygen in the polymerizable composition.

Both the type and amount of initiator can affect the polymerization rate. In general, increasing the amount of the initiator tends to lower the BET specific surface area; however, if the amount of initiator is too low, it may be difficult to obtain high conversions of the monomers to polymeric material. The free radical initiator is typically present in an amount in a range of 0.05 to 10 weight percent, 0.05 to 8 weight percent, 0.05 to 5 weight percent, 0.1 to 10 weight percent, 0.1 to 8 weight percent, 0.1 to 5 weight percent, 0.5 to 10 weight percent, 0.5 to 8 weight percent, 0.5 to 5 weight percent, 1 to 10 weight percent, 1 to 8 weight percent, or 1 to 5 weight percent. The weight percent is based on the total weight of monomers in the polymerizable composition.

Suitable thermal initiators include organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile)), which is often referred to as AIBN, and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide and mixtures thereof. The temperature needed to activate the thermal initiator is often in a range of 25° C. to 160° C., in a range of 30° C. to 150° C., in a range of 40° C. to 150° C., in a range of 50° C. to 150° C., in a range of 50° C. to 120° C., or in a range of 50° C. to 110° C.

Suitable redox initiators include arylsulfinate salts, triarylsulfonium salts, or N,N-dialkylaniline (e.g., N,N-dimethylaniline) in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al(III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition is typically free or substantially free of surfactants. As used herein, the term "substantially free" in reference to the surfactant means that no surfactant is purposefully added to the polymerizable composition and any surfactant that may be present is the result of being an impurity in one of the components of the polymerizable composition (e.g., an impurity in the organic solvent or in one of the monomers). The polymerizable composition typically contains less than 0.5 weight percent, less than 0.3 weight percent, less than 0.2 weight percent, less than 0.1 weight percent, less than 0.05 weight percent, or less than 0.01 weight percent surfactant based on the total weight of the polymerizable composition. The absence of a surfactant is advantageous because these materials tend to restrict access to and, in some cases, fill micropores and mesopores in a precursor polymeric material.

When the polymerizable composition is heated in the presence of a free radical initiator, polymerization of the monomers in the monomer mixture occurs. By balancing the amounts of each monomer in the monomer mixture and by selection of an organic solvent that can solubilize all of the monomers and the growing polymeric material during its early formation stage, a precursor polymeric material can be prepared that has a BET specific surface area equal to at least 100 m²/gram. The BET specific surface area of the precursor polymeric material can be at least 150 m²/gram, at least 200 m²/gram, or at least 300 m²/gram. The BET specific surface area can be, for example, up to 1000 m²/gram or higher, up to 900 m²/gram, up to 800 m²/gram, up to 750 m²/gram, or up to 700 m²/gram.

The precursor polymeric material is the reaction product of the polymerizable composition. The precursor polymeric material formed from the polymerizable composition contains (a) 8 to 65 weight percent of a first monomeric unit of Formula (II),

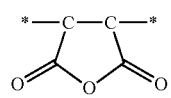

(b) 30 to 85 weight percent of a second monomeric unit of Formula (III), and

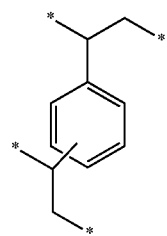

(c) 0 to 40 weight percent of a third monomeric unit of Formula (IV) wherein $R_3$ is hydrogen or alkyl (e.g., an alkyl having 1 to 10 carbon atoms, 1 to 6 carbon atoms, or 1 to 4 carbon atoms).

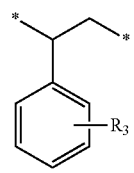

In many embodiments, to be particularly effective as a polymeric sorbent for aldehydes, the precursor polymeric material contains (a) 15 to 65 weight percent of a first monomeric unit of Formula (II), (b) 30 to 85 weight percent of a second monomeric unit of Formula (III), and (c) 0 to 40 weight percent (or 5 to 40 weight percent) of a third monomeric unit of Formula (IV). Each weight percent value is based on the total weight of monomeric units in the precursor polymeric material.

Some embodiments of the precursor polymeric material contain 25 to 65 weight percent of the first monomeric unit of Formula (II), 30 to 75 weight percent of the second monomeric unit of Formula (III), and 1 to 20 weight percent (or 5 to 20 weight percent) of the third monomeric unit of Formula (IV). Some embodiments contain 25 to 60 weight percent of the first monomeric unit of Formula (II), 30 to 75 weight percent of the second monomeric unit of Formula (III), and 1 to 30 weight percent (or 5 to 30 weight percent or 10 to 30 weight percent) of the third monomeric unit of Formula (IV). In still other embodiments, the monomer mixture contains 30 to 65 weight percent of the first monomeric unit of Formula (II), 30 to 70 weight percent of the second monomeric unit of Formula (III), and 1 to 20 weight percent (or 5 to 20 weight percent or 10 to 20 weight percent) of the third monomeric unit of Formula (IV). In still other embodiments, the monomer mixture contains 30 to 60 weight percent of the first monomeric unit of Formula (II), 30 to 65 weight percent of the second monomeric unit of Formula (III), and 1 to 20 weight percent (or 5 to 20 weight percent or 10 to 20 weight percent) of the third monomeric unit of Formula (IV). In further embodiments, the monomer mixture contains 40 to 60 weight percent of the first monomeric unit of Formula (II), 30 to 55 weight percent of the second monomeric unit of Formula (III), and 1 to 20 weight percent (or 5 to 20 weight percent, or 10 to 20 weight percent) of the third monomeric unit of Formula (IV). In still further embodiments, the monomer mixture contains 20 to 40 weight percent of the first monomeric unit of Formula (II), 50 to 70 weight percent of the second monomeric unit of Formula (III), and 1 to 20 weight percent (or 5 to 20 weight percent or 10 to 20 weight percent) of the third monomeric unit of Formula (IV). The weight percent values are based on the total weight of monomeric units used in the precursor polymeric material.

The polymeric sorbent is formed by reacting the precursor polymeric material with a nitrogen-containing compound. The nitrogen-containing compound, which is usually basic, reacts with the anhydride group in the precursor polymeric material. That is, the nitrogen-containing compound reacts with the monomeric units of Formula (II) within the precursor polymeric material. This reaction results in the formation of a covalent bond linking the nitrogen-containing compound to the polymeric material. That is, the polymeric sorbent has covalently attached nitrogen-containing groups.

The nitrogen-containing compound is ammonia, a compound having a single primary amino group (—$NH_2$), or a compound having two or more groups of formula —NHR where R is hydrogen or alkyl. Suitable alkyl R groups (i.e., an alkyl is a monovalent radical of an alkane) often have 1 to 20 carbon atoms. For example, the alkyl can have at least 1 carbon atom, at least 2 carbon atoms, or at least 4 carbon atoms and can have up to 20 carbon atoms, up to 18 carbon atoms, up to 16 carbon atoms, up to 10 carbon atoms, or up to 6 carbon atoms. In some embodiments, the alkyl has 1 to 10 carbon atoms, 1 to 6 carbon atoms, or 1 to 4 carbon atoms.

The nitrogen-containing compounds having a single primary amino group is a primary amine compound and typically does not include other primary and/or secondary amino groups. That is, there is a single nitrogen-containing group and it is —$NH_2$. The nitrogen-containing compound having at least two amino groups of formula —NHR can have two or more primary amino groups (where R is equal to hydrogen), can have two or more secondary amino groups (where R is equal to an alkyl), or can have at least one primary amino group plus at least one secondary amino group.

Many suitable nitrogen-containing compounds are of Formula (V).

$R_4NHR_1$        (V)

In Formula (V), the group $R_1$ is hydrogen or an alkyl. The group $R_4$ is hydrogen, alkyl, or a group of formula —$R_5$—$NHR_6$, or —(C=NH)—$NH_2$. The group $R_5$ is a covalent bond, an alkylene, an arylene, an aralkylene, a heteroalkylene having one or more oxy (—O—) groups, or a heteroalkylene having one or more —NH— groups. The group $R_6$ is hydrogen, alkyl, or —(C=NH)—$NH_2$.

Formula (V) is equal to ammonia when both $R_1$ and $R_4$ are hydrogen. Formula (V) is equal to a compound having a single primary amino group when $R_1$ is hydrogen and $R_4$ is alkyl. Formula (V) is equal to a compound having two or more groups of formula —NHR when $R_4$ is —$R_5$—$NHR_6$ or when $R_4$ is —(C=NH)—$NH_2$.

Suitable alkyl groups for $R_1$ in Formula (V) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms.

In some embodiments, $R_4$ in Formula (V) is an alkyl. To be suitable as a nitrogen-containing compound, $R_1$ is equal to hydrogen when $R_4$ is an alkyl. That is, the compound of Formula (V) is a primary amine compound. Suitable alkyl groups for $R_4$ often have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. Examples of suitable primary amine compounds include, but are not limited to, methylamine, ethylamine, propylamine, butylamine, and cyclohexylamine.

In some embodiments, $R_4$ in Formula (V) is a group of formula —$R_5$—$NHR_6$ and the nitrogen-containing compound is of Formula (V-1).

$R_6HN$—$R_5$—$NHR_1$        (V-1)

Such compounds have at least two amino groups of formula —NHR. Suitable alkyl groups for $R_6$ in Formula (V-1) can have at least 1 carbon atom, at least 2 carbon atoms, or at least 4 carbon atoms and can have up to 20 carbon atoms, up to 18 carbon atoms, up to 12 carbon atoms, up to 10 carbon atoms, or up to 6 carbon atoms. In some embodiments, the alkyl has 1 to 10 carbon atoms, 1 to 6 carbon atoms, or 1 to 4 carbon atoms. The group $R_5$ can be a covalent bond (i.e., the nitrogen containing compound is a hydrazine compound), an alkylene (i.e., an alkylene is a divalent radical of an alkane), an arylene, an aralkylene, a heteroalkylene having one or more oxy (—O—) groups, or a heteroalkylene having one or more —NH— groups.

Suitable alkylene $R_5$ groups in Formula (V-1) usually have at least 1 carbon atom, at least 2 carbon atoms, at least 3 carbon atoms, or at least 4 carbon atoms and can have up to 20 carbon atoms, up to 16 carbon atoms, up to 12 carbon atoms, up to 10 carbon atoms, or up to 6 carbon atoms. Some nitrogen-containing compounds are of Formula (V-1) with $R_1$ being hydrogen, $R_5$ being an alkylene, and $R_6$ being hydrogen. Examples of such nitrogen-containing compounds are alkylene diamines such as, for example, methylene diamine, ethylene diamine, propylene diamine, and butylene diamine. Nitrogen-containing compounds of Formula (V-1) having both $R_1$ and $R_6$ equal to alkyl include N,N'-dimethylethylene diamine.

In other embodiments of the compounds of Formula (V-1), the group $R_5$ is a heteroalkylene (i.e., a heteroalkylene is a divalent radical of a heteroalkane, which is an alkane having catenary heteroatoms) having at least one catenary —O— or —NH-group. Stated differently, heteroalkylene $R_3$ groups have one or more groups of formula —$R_a$—[O—$R_b$]$_n$— or —$R_a$—[NH—$R_b$]$_n$— where each $R_a$ and each $R_b$ are independently an alkylene and n is an integer in a range 1 to 50, 1 to 40, 1 to 30, 1 to 20, 1 to 10, 1 to 6, or 1 to 4. Suitable $R_a$ and $R_b$ alkylene groups often have 1 to 10 carbon atoms, 1 to 6 carbon atoms, 1 to 4 carbon atoms, or 1 to 3 carbon atoms. The heteroalkylene often has up to 30 carbon atoms and up to 16 heteroatoms, up to 20 carbon atoms and up to 11 heteroatoms, or up to 10 carbon atoms and up to 6 heteroatoms. Such nitrogen-containing compounds can be represented by Formulas (V-2) and (V-3).

  (V-2)

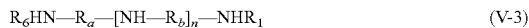  (V-3)

Some nitrogen-containing compounds are of Formula (V-2) with $R_1$ being hydrogen, $R_5$ being a heteroalkylene with —O— groups, and $R_6$ being hydrogen. Examples of such nitrogen-containing compounds are poly(alkylene oxide) diamines such as polyethylene glycol diamine and polypropylene glycol diamine. Further nitrogen-containing compounds are of Formula (V-3) with $R_1$ being hydrogen, $R_5$ being a heteroalkylene with —NH-groups, and $R_6$ being hydrogen. Such nitrogen-containing compounds can be, for example, compounds of formula $H_2N$—[(CH$_2$)$_x$NH]$_y$—(CH$_2$)$_x$NH$_2$ where x is an integer in a range of 1 to 4 and y is in a range of 1 to 10. Examples include diethylene triamine, triethylene tetramine, and tetraethylene pentamine.

The $R_5$ group in Formula (V-1) can also be an arylene or aralkylene group. Suitable arylene (i.e., divalent radical of a carbocyclic aromatic compound) $R_5$ groups typically have 6 to 12 carbon atoms and are often phenylene or diphenylene. Suitable aralkylene $R_5$ groups refer to divalent groups that have an alkylene substituted by an aryl group, an arylene substituted with an alkyl group, or an arylene bonded to an alkylene group. The alkylene or alkyl portion of the aralkylene often has 1 to 10 carbon atoms, 1 to 6 carbon atoms, or 1 to 4 carbon atoms. The aryl or arylene portion of the aralkylene often has 6 to 12 carbon atoms and is often either phenyl or phenylene. Example nitrogen-containing compounds of Formula (V-1) with both $R_1$ and $R_6$ being hydrogen and $R_5$ being arylene include, but are not limited to, phenylene diamine.

Yet other nitrogen-containing compounds are of Formula (V-1) with $R_6$ being —(C=NH)—NH$_2$ as shown in Formula (V-4).

  (V-4)

For example, in some compounds, $R_1$ is hydrogen and $R_5$ is alkylene. One such compound is agmatine. Agmatine can be represented by other resonance structures as well but is considered to be within the scope of both Formula (V-1) and (V-4).

In other embodiments of Formula (V), $R_4$ is a group —(C=NH)—NH$_2$. The resulting compounds are of Formula (V-5).

  (V-5)

This compound is guanidine when $R_1$ is hydrogen.

Other suitable nitrogen-containing compounds are polyamines having at least three groups of formula —NHR$_1$ where $R_1$ is hydrogen or alkyl. Such compounds can be of Formula (VI).

  (VI)

In Formula (VI), $R_1$ is defined as above and the variable z is equal to at least 3 and can be up to 10, up to 8, up to 6, or up to 4. The $R_7$ group is often a z-valent radical of an alkane or a z-valent radical of a heteroalkane. Suitable z-valent radicals of alkanes often have a branching carbon atom with at least three of the four adjacent groups being —CH$_2$-. Suitable z-valent radicals of heteroalkanes often have a branching nitrogen atom with three adjacent carbon atoms (e.g., three adjacent groups that are alkylene or alkyl groups) or a branching carbon atom with at least three of the four adjacent atoms being carbon (e.g., three adjacent groups that are alkylene or alkyl groups). These z-valent radicals of heteroalkanes often include one or more groups of formula —$R_c$—[NH—$R_d$]$_p$— where each $R_c$ and each $R_d$ are independently an alkylene and p is an integer in a range 1 to 50, 1 to 40, 1 to 30, 1 to 20, 1 to 10, 1 to 6, or 1 to 4. Suitable $R_c$ and $R_d$ alkylene groups often have 1 to 10 carbon atoms, 1 to 6 carbon atoms, 1 to 4 carbon atoms, or 1 to 3 carbon atoms. The z-valent radicals of alkanes often have at least 2 carbon atoms, at least 3 carbon atoms, at least 4 carbon atoms, or at least 5 carbon atoms and up to 20 carbon atoms, up to 16 carbon atoms, up to 12 carbon atoms, or up to 8 carbon atoms. The z-valent radicals of heteroalkanes often have up to 30 carbon atoms and up to 16 heteroatoms, up to 20 carbon atoms and up to 11 heteroatoms, or up to 10 carbon atoms and up to 6 heteroatoms.

Specific polyamines of formula $R_7$—(NHR$_1$)$_z$ include various polyimines. Some polyimines include one or more branching nitrogen atoms with each nitrogen-branching atom connected to three groups of formula —$R_c$—[NH—$R_d$]$_p$—. The end group of each branched segment is often a group of formula —NHR$_1$ such as —NH$_2$. Examples include various branched polyethyleneimines. Another specific polyamine is 2-(aminomethyl)-2-methyl-1,3-propanediamine where $R_7$ is a trivalent radical of an alkane (i.e., the carbon branching atom is connected to four carbon atoms with three adjacent alkylene groups and one adjacent methyl group), each $R_1$ is hydrogen, and z is equal to 3.

In many embodiments, the nitrogen-containing compounds such as those of Formula (V) (including Formula V-1 to V-5) and Formula (VI) have a molecular weight (or weight average molecular weight) that is no greater than 2000 Daltons (Da). For example, the molecular weight (or weight average molecular weight) is no greater than 1500 Da, no greater than 1000 Da, no greater than 750 Da, no greater than 500 Da, or no greater than 250 Da.

The nitrogen-containing compound reacts with the monomeric units of Formula (II) in the precursor polymeric material. This reaction results in the covalent bonding of the nitrogen-containing compound to the polymeric material with the reaction sites being the anhydride group (—(CO)—O—(CO)—) in the monomeric unit of Formula (II). The ring structure is typically opened, forming monomeric units of Formula (VII), Formula (VIII), or a mixture thereof.

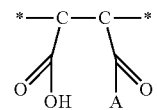  (VII)

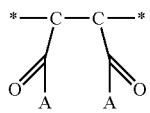

(VIII)

In Formula (VII) and (VIII), group A is equal to —$NR_1R_4$ if a nitrogen-containing compound of Formula (V) is used and is equal to —$NR_1$—$R_7(NHR_1)_{z-1}$ if a nitrogen-containing compound of Formula (VI) is used. Alternatively, a ring structure could possibly form such as shown in Formula (IX) where $A_1$ is a divalent group and is equal to the compound of Formula (V) or to the compound of Formula (VI) minus two hydrogen atoms.

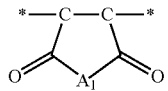

(IX)

In some embodiments, the polymeric sorbent is formed using a compound of Formula (V) as the nitrogen-containing compound.

$$R_4NHR_1 \quad (V)$$

If $R_4$ is hydrogen, the polymeric sorbent contains nitrogen-containing groups of formula —$NHR_1$. When such a polymeric sorbent having $R_1$ groups equal to hydrogen is exposed to an aldehyde $R_2$—(CO)—H, the resulting polymeric material can have groups of formula —NH—$CHR_2$—OH, —N($CHR_2$—OH)$_2$, —N=$CR_2$H, or a combination thereof. When such a polymeric sorbent having $R_1$ groups equal to an alkyl is exposed to an aldehyde $R_2$—(CO)—H the resulting polymeric material can have groups of formula —$NR_1$—$CHR_2$—OH.

In other embodiments, the polymeric sorbent is formed using a compound of Formula (V-1) as the nitrogen-containing compound.

$$R_6HN—R_5—NHR_1 \quad (V-1)$$

The resulting polymeric sorbent can have nitrogen-containing groups of formula —$NR_6$—$R_5$—$NHR_1$, —$NR_1$—$R_5$—$NHR_6$, or both. If the terminal $R_1$ of the group of formula —$NR_6$—$R_5$—$NHR_1$ is hydrogen, the polymeric sorbent after exposure to the aldehyde $R_2$—(CO)—H can have groups of formula —$NR_6$—$R_5$—NH—$CHR_2$—OH, —$NR_6$—$R_5$—N($CHR_2$—OH)$_2$, —$NR_6$—$R_5$—N=$CR_2$H, or a mixture thereof. Likewise, if the terminal $R_6$ of the group of formula —$NR_1$—$R_5$—$NHR_6$ is hydrogen, the polymeric sorbent after exposure to the aldehyde $R_2$—(CO)—H can have groups of formula —$NR_1$—$R_5$—NH—$CHR_2$—OH, —$NR_1$—$R_5$—N($CHR_2$—OH)$_2$, —$NR_1$—$R_5$—N=$CR_2$H, or a mixture thereof. If the terminal $R_1$ of the group of formula —$NR_6$—$R_5$—$NHR_1$ is alkyl, the polymeric sorbent after exposure to the aldehyde $R_2$—(CO)—H can have groups of formula —$NR_6$—$R_5$—$NR_1$—$CHR_2$—OH. Likewise, if the terminal $R_6$ of the group of formula —$NR_1$—$R_5$—$NHR_6$ is alkyl, the polymeric sorbent after exposure to the aldehyde $R_2$—(CO)—H can have groups of formula —$NR_1$—$R_5$—$NR_6$—$CHR_2$—OH. Additional amounts of aldehyde can react with any remaining primary amino group or secondary amino group.

In yet other embodiments, the polymeric sorbent is formed using a compound of Formula (V-4) as the nitrogen-containing compound.

$$NH_2—(C=NH)—HN—R_5—NHR_1 \quad (V-4)$$

The resulting polymeric sorbent can have nitrogen-containing groups of formula —NH—(C=NH)—NH—$R_5$—$NHR_1$, —$NR_1$—$R_5$—NH—(C=NH)—$NH_2$, or both. If the terminal $R_1$ of the group of formula —NH—(C=NH)—NH—$R_5$—$NHR_1$ is hydrogen, the polymeric sorbent after exposure to the aldehyde $R_2$—(CO)—H can have groups of formula —NH—(C=NH)—NH—$R_5$—NH—$CHR_2$—OH, —NH—(C=NH)—NH—$R_5$—N($CHR_2$—OH)$_2$, —NH—(C=NH)—NH—$R_5$—N=$CR_2$H, or a mixture thereof. If the terminal $R_1$ of the group of formula —NH—(C=NH)—NH—$R_5$—$NHR_1$ is an alkyl, the polymeric sorbent after exposure to the aldehyde $R_2$—(CO)—H can have groups of formula —NH—(C=NH)—NH—$R_5$—$NR_1$—$CHR_2$—OH. If the polymeric sorbent has groups of formula —$NR_1$—$R_5$—NH—(C=NH)—$NH_2$, the polymeric sorbent after exposure to the aldehyde $R_2$—(CO)—H can have groups of formula —$NR_1$—$R_5$—NH—(C=NH)—NH—$CHR_2$—OH, —$NR_1$—$R_5$—NH—(C=NH)—N($CHR_2$—OH)$_2$, —$NR_1$—$R_5$—NH—(C=NH)—N=$CR_2$H, or a mixture thereof. Additional amounts of aldehyde can react with any remaining primary amino group or secondary amino group.

In yet further embodiments, the polymeric sorbent is formed using a compound of Formula (V-5)

$$H_2N—(C=NH)—NHR_1 \quad (V-5)$$

as the nitrogen-containing compound. The resulting polymeric sorbent can have nitrogen-containing groups of formula —NH—(C=NH)—$NHR_1$, —$NR_1$—(C=NH)—$NH_2$, or both. If the terminal $R_1$ of the group of formula —NH—(C=NH)—$NHR_1$ is hydrogen, the polymeric sorbent after exposure to the aldehyde $R_2$—(CO)—H can have groups of formula —NH—(C=NH)—NH—$CHR_2$—OH, —NH—(C=NH)—N($CHR_2$—OH)$_2$, —NH—(C=NH)—N=$CR_2$H, or a mixture thereof. If the terminal $R_1$ of the group of formula —NH—(C=NH)—$NHR_1$ is alkyl, the polymeric sorbent after exposure to the aldehyde $R_2$—(CO)—H can have groups of formula —NH—(C=NH)—$NR_1$—$CHR_2$—OH. If the polymeric sorbent has groups of formula —$NR_1$—(C=NH)—$NH_2$, the polymeric sorbent after exposure to the aldehyde $R_2$—(CO)—H can have groups of formula —$NR_1$—(C=NH)—NH—$CHR_2$—OH, —$NR_1$—(C=NH)—N($CHR_2$—OH)$_2$, —$NR_1$—(C=NH)—N=$CR_2$H, or a mixture thereof. Additional amounts of aldehyde can react with any remaining primary amino group or secondary amino group.

In still further embodiments, the polymeric sorbent is formed using a compound of Formula (VI) as the nitrogen-containing compound.

$$R_7—(NHR_1)_z \quad (VI)$$

The resulting polymeric sorbent can have nitrogen-containing groups of formula —$NR_1$—$R_7$—$(NHR_1)_{z-1}$. If one of the terminal $R_1$ of the group of formula —$NR_1$—$R_7$—$(NHR_1)_{z-1}$ is hydrogen, the polymeric sorbent after exposure to the aldehyde $R_2$—(CO)—H can have groups of formula —$NR_1$—$R_7$—$(NHR_1)_{z-2}$(NH—$CHR_2$OH), —$NR_1$—$R_7$—$(NHR_1)_{z-2}$(N($CHR_2$OH)$_2$), —$NR_1$—$R_7$—$(NHR_1)_{z-2}$(N=$CR_2$H), or a mixture thereof. If one of the terminal $R_1$ of the group of formula —$NR_1$—$R_7$—$(NHR_1)_{z-1}$ is alkyl, the polymeric sorbent after exposure to the aldehyde $R_2$—(CO)—H can have groups of formula —NR$_1$—R$_7$—(NHR$_1$)$_{z-2}$(NR$_1$—CHR$_2$OH). In some of these embodiments, more than one terminal —NHR$_1$ group can react with the aldehyde. In addition to the terminal groups, the aldehyde can react with any other primary and/or secondary amino group on the polymeric sorbent.

Up to two moles of nitrogen-containing compound could be added for every mole of monomeric units of Formula (II) in the precursor polymeric material. That is, up to 200 mole percent nitrogen-containing compound can react with the precursor polymeric material based on the total moles of monomeric units of Formula (II). In some embodiments, the amount of nitrogen-containing compound added is up to 175 mole percent, up to 150 mole percent, up to 125 mole percent, or up to 100 mole percent based on the total moles of monomeric units of Formula (II) in the precursor polymeric material. The amount of the nitrogen-containing compound can be at least 1 mole percent, at least 2 mole percent, at least 5 mole percent, at least 10 mole percent, at least 20 mole percent, at least 50 mole percent, at least 75 mole percent, or at least 100 mole percent based on the total moles of monomeric units of Formula (II) in the precursor polymeric material. In some embodiments, the amount of nitrogen-containing compound is in a range of 1 to 200 mole percent, in a range of 10 to 200 mole percent, in a range of 50 to 200 mole percent, in a range of 50 to 150 mole percent, a range of 75 to 150 mole percent, in a range of 75 to 125 mole percent, or in a range of 100 to 200 mole percent based on the total moles of monomeric units of Formula (II) in the precursor polymeric material.

To react the nitrogen-containing compound with the precursor polymeric material, the nitrogen-containing compound is often dissolved in water and/or a suitable organic solvent although other methods can be used. Suitable organic solvents are those that dissolve but do not react with the nitrogen-containing compound. Exemplary organic solvents include, but are not limited to, alcohols, ethers such as tetrahydrofuran and diethyl ether, and various chlorinated solvents such as methylene chloride and chloroform. The concentration of the nitrogen-containing compound in water and/or organic solvent can be any suitable amount depending on the solubility of the nitrogen-containing compound. In some embodiments, the concentration of the nitrogen-containing compound in water and/or organic solvent is in a range of 1 to 40 weight percent, in a range of 1 to 30 weight percent, in a range of 1 to 20 weight percent, or in a range of 1 to 10 weight percent.

The solution of the nitrogen-containing compound is mixed with the precursor polymeric material. The reaction between the nitrogen-containing compounds and the monomeric units of Formula (II) can occur at room temperature or can occur by heating the mixture to a temperature above room temperature. For example, the mixture can be heated at temperatures in a range of 30° C. to 120° C. for several hours to several days. In some embodiments, the suspension is heated at a temperature in a range of 30° C. to 100° C., in a range of 40° C. to 90° C., in a range of 50° C. to 90° C., or in a range of 60° C. to 80° C. for 12 to 24 hours.

The polymeric sorbent typically has a BET specific surface area that is less than that of the precursor polymeric material. The opening of the anhydride group to form the monomeric units of Formula (VII) and (VIII) may sufficiently increase the conformational freedom in the backbone resulting in decreased porosity. In addition, hydrogen bonding between the nitrogen-containing groups in the monomeric units of Formula (VII), (VIII), and (IX) could possibly restrict or block access to pores. Because of this decrease, it is often desirable to prepare a precursor polymeric material having the highest possible BET specific surface area, yet having sufficient anhydride groups to react with the nitrogen-containing compound.

The polymeric sorbent typically has a BET specific surface area equal to at least 25 m$^2$/gram. In some embodiments, the BET specific surface area is at least 50 m$^2$/gram, at least 75 m$^2$/gram, or at least 100 m$^2$/gram. The BET specific surface area can be up to 700 m$^2$/gram or higher, up to 600 m$^2$/gram, up to 500 m$^2$/gram, up to 400 m$^2$/gram, up to 300 m$^2$/gram, or up to 200 m$^2$/gram. In some embodiments, the BET specific surface area is in a range of 25 to 600 m$^2$/gram, in a range of 25 to 500 m$^2$/gram, in a range of 25 to 400 m$^2$/gram, in a range of 25 to 300 m$^2$/gram, in a range of 50 to 300 m$^2$/gram, in a range of 50 to 200 m$^2$/gram, in a range of 75 to 200 m$^2$/gram, or in a range of 50 to 100 m$^2$/gram.

The BET specific surface area is at least partially attributable to the presence of micropores and/or mesopores in the polymeric sorbent. The argon adsorption isotherms (at 77 K) of the polymeric sorbent indicate that there is considerable adsorption of argon at relative pressures below 0.1, which suggests that micropores are present. There is a gradual increase in adsorption at relative pressures between 0.1 and about 0.95. This increase is indicative of a wide size distribution of mesopores.

In some embodiments, at least 20 percent of the BET specific surface area of the polymeric sorbent is attributable to the presence of micropores and/or mesopores. The percentage of the BET specific surface area attributable to the presence of micropores and/or mesopores can be at least 25 percent, at least 30 percent, at least 40 percent, at least 50 percent, or at least 60 percent. In some embodiments, the percentage of the BET specific surface area attributable to the presence of micropores and/or mesopores can be up to 90 percent or higher, up to 80 percent or higher, or up to 75 percent or higher.

The porous polymeric sorbent has a total pore volume equal to at least 0.05 cm$^3$/gram. Total pore volume is calculated from the amount of argon adsorbed at liquid nitrogen temperature (77 K) at a relative pressure (p/p$^o$) equal to approximately 0.98 (e.g., 0.98±0.01). In some embodiments, the total pore volume is at least 0.075 cm$^3$/gram, at least 0.10 cm$^3$/gram, at least 0.15 cm$^3$/gram, at least 0.20 cm$^3$/gram, at least 0.25 cm$^3$/gram, or at least 0.30 cm$^3$/gram. The total pore volume can be up to 1.0 cm$^3$/gram or even higher, up to 0.9 cm$^3$/gram, up to 0.8 cm$^3$/gram, up to 0.7 cm$^3$/gram, up to 0.6 cm$^3$/gram, up to 0.5 cm$^3$/gram, up to 0.4 cm$^3$/gram, up to 0.3 cm$^3$/gram, or up to 0.2 cm$^3$/gram. The pore volume is often in a range of 0.05 to 1 cm$^3$/gram, in a range of 0.05 to 0.8 cm$^3$/gram, in a range of 0.05 to 0.6 cm$^3$/gram, in a range of 0.05 to 0.4 cm$^3$/gram, in a range of 0.05 to 0.2 cm$^3$/gram, or in a range of 0.075 to 0.2 cm$^3$/gram.

The structure of the divinylbenzene/maleic anhydride polymeric material is particularly well suited for use as a precursor polymeric material for the porous polymeric sorbent. Providing that the content of monomeric units of Formula (IV) from styrene-type monomers is low, the divinylbenzene/maleic anhydride precursor polymeric material has alternating monomeric units from divinylbenzene and maleic anhydride. This structure results in high crosslinking and contributes to the formation of a porous polymeric material, particularly a porous polymeric material having a high content of micropores and/or mesopores.

In some embodiments, the polymeric sorbent further includes an acid-base colorimetric indicator. The acid-base colorimetric indicator (i.e., a dye (typically an organic dye) that changes color when it undergoes a transition from being in an acidic form to being in a basic form) can be added at the same time as the nitrogen-containing compound or can be added after addition of the nitrogen-containing compound. The acid-base colorimetric indicator is typically selected to have a $pK_b$ that is less than a $pK_b$ of the nitrogen-containing compound. That is, the acid-base colorimetric indicator is selected to change from a first color to a second color when all or a significant portion of the available nitrogen-containing groups on the polymeric sorbent have reacted with an aldehyde. The change in color signals that the capacity of the polymeric sorbent for sorption of an aldehyde has been reached or is close to being reached. As used herein, the term "close to being reached" means that at least 60 percent or more of the capacity has been reached (i.e., a least 60 percent or more of the available sorption sites have been used for sorption of an aldehyde). For example, at least 70 percent, at least 80 percent, at least 90 percent, or at least 95 percent of the sorption sites have been used for sorption of an aldehyde.

Knowing the $pK_b$ of the nitrogen-containing compound, one of skill in the art can readily select an acid-base colorimetric indicator that has a lower $pK_b$ value. In some applications, the difference between the $pK_b$ value of the nitrogen-containing compound and the $pK_b$ of the acid-base colorimetric indicator is at least 1, at least 2, at least 3, or at least 4. The $pK_b$ of the acid-base colorimetric indicator is often in a range of 3 to 10.

Example acid-base colorimetric indicators include, but are not limited to, methyl red, bromoxylenol blue, pararosaniline, chrysoidine, thymol blue, methyl yellow, bromophenyl blue, Congo red, methyl orange, bromocresol green, azolitmin, bromocresol purple, bromothymol blue, phenol red, neutral red, naphtholphthalein, cresol red, phenolphthalein, and thymolphthalein.

The acid-base colorimetric indicators can be added to the polymeric sorbent using any suitable method. In some embodiments, the polymeric sorbent is soaked in a solution of the acid-base colorimetric indicator for at least 10 minutes, at least 20 minutes, at least 30 minutes, at least 1 hour, at least 2 hours, at least 4 hours, or at least 8 hours. The solution of the acid-base colorimetric indicator is often in a concentration range of 5 to 10 milligrams per milliliter. Often, about 0.5 grams of the polymeric sorbent is soaked in about 10 milliliters of the solution.

The polymeric sorbents offer a distinct advantage over sorbents based on impregnation of a capture agent. The capture agents are typically simply sorbed on the matrix material such as, for example, activated carbon. That is, the capture agents are usually not covalently attached to the matrix material and can migrate. In contrast, the polymeric sorbents described herein have covalently attached nitrogen-containing groups that interact with the aldehyde and that do not migrate.

Binders

A binder is combined with the polymeric sorbent to prepare the composite granules. The binder can be an organic material (such as, for example, a cellulose resin), an inorganic material (such as, for example, a metal silicate salt), or a combination thereof (a compound having an inorganic portion and an organic portion such as, for example, a metal carboxylate salt). In many embodiments, the binder is a salt or a polymeric material.

In certain embodiments, the binder includes a polyelectrolyte material. Any suitable polyelectrolyte material can be used including those with organic or inorganic counterions. Some suitable polyelectrolyte material is derived from natural polymers or modified natural polymers. Example polyelectrolyte include, but are not limited to, polyamines, polyamides, polyalcohols, polysaacharides, polyacrylamides, polyacrylates, humic acids, proteins, polydiallyldimethylammonium salts such as polydiallyldimethylammonium chloride, polyamine-polydiallyldimethylammonium chloride blends, polyquartenary amines, inorganic-polyamine blends, and inorganic-polydiallyldimethylammonium chloride blends, cationic starches, cationic polymethylmethacrylates, copolymers of vinylimidazolium methochloride and vinylpyrrolidone, quarternized vinylpyrrolidone/dimethylaminoethyl methacrylate copolymers, polyethyleneimines, and mixtures thereof. In certain embodiments, the polyelectrolyte material includes cationic starches.

In certain embodiments, the binder includes metal hydroxides, metal oxides, metal salts, organometallic compounds, or combinations thereof. Some suitable metal oxide, metal hydroxide, and metal salt binders are derived from aluminum, calcium, magnesium, or iron (including polyaluminum sulfates and polyaluminum chlorides). Other example binders are polyorganozirconates, polyorganoaluminates, polysiloxanes, polysilanes, polysilazanes, polycarbosilanes, polyborosilanes, zirconium dimethacrylate, zirconium tetramethacrylate, zirconium 2-ethylhexanoate, aluminum butoxides, aluminum diisopropoxide ethylacetoacetate, tetramethyldisiloxanes, tristrimethylsilylphosphate, tristrimethylsiloxyboron, and combinations thereof. Some example metal salts are metal carboxylate salts such as metal carboxylate salts having 10 to 20 carbon atoms (e.g., magnesium stearate). Other example inorganic binders are silicate salts (e.g., metal silicates). Example metal silicates include sodium silicate (e.g., sodium metasilicate), potassium silicate, calcium silicate, magnesium silicate, and combinations thereof. In certain embodiments, the silicate is sodium metasilicate.

Other example binders include a thermoplastic polymer. The thermoplastic polymer can be selected, for example, from polyamides (such as nylons), polyolefins (such as polyethylenes, e.g., LDPE, LLDPE, HDPE, polyethylene copolymers with other polyolefins, and polypropylenes), polyvinylchlorides (both plasticized and unplasticized), fluorocarbon resins (such as polytetrafluoroethylene), polystyrenes, acrylic resins (such as polyacrylates and polymethacrylates), styrene copolymers (such as acrylonitrile-butadiene-styrenes and acrylonitrile-styrenes), polycarbonates, polyvinylacetates, ethylene-vinyl acetate copolymers, polyvinyl alcohols, polyoxymethylene, polyformaldehyde, polyacetals, polyesters (such as polyethylene terephthalate), polyether ether ketones, and phenol-formaldehyde resins (such as resols and novolacs), and combinations thereof.

Yet other example binders include a thermoset polymer. For example, the thermoset polymer is selected from polyurethanes, silicones, fluorosilicones, phenolic resins, melamine resins, melamine formaldehyde resins, and urea formaldehyde resins.

Still other example binders include an elastomer. In certain embodiments, the elastomer is selected from natural rubbers, synthetic rubbers (such as styrene-butadiene rubber, polychloroprene (neoprene), nitrile rubber, and butyl rubber), silicones, polyurethanes, alkylated chlorosulfonated polyethylenes, polyolefins, chlorosulfonated polyethylenes, perfluoroelastomers, ethylene-propylene-diene terpolymers, chlorinated polyethylene, fluoroelastomers, and mixtures thereof.

In certain embodiments, the binder includes a naturally occurring polymer. Example naturally occurring polymer can be selected from celluloses, collagens, organic acids, and combinations thereof. For example, the naturally occurring polymer can be a biodegradable polymer. Suitable biodegradable polymers can be selected from polyethyleneglycols, polylactic acids, polyvinylalcohols, cellulosic resins (such as cellulose acetate butyrates, carboxy methyl cellulose, and cellulose ethers such as hydroxypropyl methylcellulose), alginic acid, carrageenans isolated from seaweed, polysaccharides, pectins, xanthans, starches, copolymers of polylactideglycolide, and combinations thereof. In some embodiments, the biodegradable polymer is selected from polyethyleneglycols, polylactic acids, polyvinylalcohols, copolymers of polylactideglycolide, and mixtures thereof.

In certain embodiments, the binder includes an electrically conductive polymer. Example electrically conductive polymers can be selected from doped polyanilines and polythiophenes.

In certain embodiments, the binder includes a gelling material, an absorbent material, or combinations thereof. Example absorbent binder material can be a superabsorbent material such as polyacrylic acids, polyacrylamides, polyalcohols, polyamines, polyethylene oxides, cellulose such as carboxymethyl cellulose, chitins, gelatins, starches, polyvinyl alcohols, polyacrylic acid, polyacrylonitrile, alginic acid, carrageenans isolated from seaweeds, polysaccharides, pectins, xanthans, polydiallyldimethylammonium chloride, polyvinylpyridine, polyvinylbenzyltrimethylammonium salts, polyvinylacetates, polylactic acids, and combinations thereof.

Method of Making Composite Granules

In another aspect, a method of preparing composite granules is provided. The method includes providing a precursor polymeric material. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The method further includes reacting the precursor polymeric material with a nitrogen-containing compound that is selected from ammonia, a compound having a single primary amino group (—NH$_2$), or a compound having at least two amino groups of formula —NHR where R is hydrogen or alkyl. The reaction results in the formation of the polymeric sorbent having a covalently attached nitrogen-containing group. The method still further includes blending the polymeric sorbent with a binder to form a blended material and preparing the composite granules from the blended material.

The composite granules often contain binder in an amount of at least 1 weight percent, at least 2 weight percent, at least 5 weight percent, or at least 10 weight percent based on the total weight of the composite granules. In certain embodiments, the binder is present in the composite granules in an amount of up to 30 weight percent, up to 25 weight percent, or up to 20 weight percent, based on the total weight of the composite granules.

The composite granules often contain polymeric sorbent in an amount of at least 70 weight percent, at least 75 weight percent, or at least 80 weight percent, based on the total weight of the composite granules. In certain embodiments, the polymeric sorbent is present in the composite granules in an amount of up to 90 weight percent, up to 95 weight percent, up to 98 weight percent, or up to 99 weight percent, based on the total weight of the composite granules.

In some embodiments, the composite granules contain 1 to 30 weight percent binder and 70 to 99 weight percent polymeric sorbent based on the total weight of the composite granules. For example, the composite granules can contain 5 to 30 weight percent binder and 70 to 95 weight percent polymeric sorbent, 10 to 30 weight percent binder and 70 to 90 weight percent polymeric sorbent, 1 to 25 weight percent binder and 75 to 99 weight percent polymeric sorbent, 5 to 25 weight percent binder and 75 to 95 weight percent polymeric sorbent, 10 to 25 weight percent binder and 75 to 90 weight percent polymeric sorbent, 1 to 20 weight percent binder and 80 to 99 weight percent polymeric sorbent, 5 to 20 weight percent binder and 80 to 95 weight percent polymeric sorbent, or 10 to 20 weight percent binder and 80 to 90 weight percent polymeric sorbent.

The polymeric sorbent and the binder are often blended together without the use of any liquid such as water or an organic solvent. The blended material can then be pressed into a pellet or disk that is subsequently ground or milled and then sieved to obtain composite granules of the desired size (e.g., the composite granules of the desired size are retained on the sieve). Any material that goes through the sieve can be collected and recycled by pressing into additional pellets or disks.

Any suitable pressure can be used to form the pellets or disks. The blended material can optionally be heated during the process of forming the pellets or disks. In some embodiments, the blended material can be heated to a temperature near (but often below) the melting point of the binder. The pressure and temperature are selected to provide pellets or disks that do not crumble (or that undergo minimal crumbling) when broken. The pellets or disks can have any suitable size, such as for example, from 0.5 to 3 centimeters, from 1 to 3 centimeters, or from 2 to 3 centimeters.

The pressure selected for forming the pellets or disks is typically in a range of 6,000 pounds per square inch (psi) to 60,000 psi or even higher. For example, the pressure is often at least 6,000 psi, at least 6,400 psi, at least 6,500 psi, at least 10,000 psi, at least 20,000 psi, or at least 25,000 psi and can be up to 60,000 psi, up to 50,000 psi, up to 40,000 psi, or up to 30,000 psi. The dwell time (the time the force is applied) can vary from a few seconds to several minutes. For example, the dwell time can be in range of 1 seconds to 10 minutes.

Method of Sorbing an Aldehyde and Compositions Resulting Therefrom

In yet another aspect, a method of sorbing (i.e., capturing) an aldehyde is provided. The method includes providing composite granules that contain a binder and a polymeric sorbent as described above. The method further includes exposing the composite granules to an aldehyde and sorbing the aldehyde on the polymeric sorbent. The aldehyde is of Formula (I)

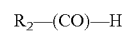

(I)

where R$_2$ is hydrogen, alkyl, vinyl, aryl, or aryl substituted with an alkyl. Suitable alkyl groups typically have 1 to 10 carbon atoms, 1 to 6 carbon atoms, 1 to 4 carbon atoms, 1 to 3 carbon atoms, or 1 carbon atom. The aryl group can have up to 12 carbon atoms or up to 6 carbon atoms. The aryl group is often phenyl. The aryl group can be substituted with an alkyl group such as an alkyl group having 1 to 4 carbon atoms or 1 to 3 carbon atoms. The molecular weight of the aldehyde of Formula (I) is typically no greater than 200 grams/mole. The aldehyde can react with any primary amino group or secondary amino group present on the polymeric sorbent.

In still another aspect, a composition comprising a reaction product of an aldehyde and composite granules is provided. The composite granules contain a binder and a polymeric sorbent as described above. The aldehyde is of Formula (I) as describe above. The aldehyde reacts with the nitrogen-containing groups of the polymeric sorbent included in the composite particles.

The aldehyde is in the form of a vapor when sorbed by the polymeric sorbent portion of the composite granule. Thus, the molecular weight of the aldehyde is typically no greater than 200 grams/mole, no greater than 150 grams/mole, no greater than 100 grams/mole, no greater than 75 grams/mole, or no greater than 50 grams/mole. Suitable aldehydes include, but are not limited to formaldehyde, acetaldehyde, propionaldehyde, butyraldehyde, pentanal (valeraldehyde), isovaleraldehyde, hexanal, benzaldehyde, 2,5-dimethylbenzaldehyde, 2,4-dimethylbenzaldehyde, 2,3-dimethylbenzaldehyde, tolualdehydes (ortho-tolualdehyde, meta-tolualdehyde, para-tolualdehyde, and mixtures thereof), acrolein and crotonaldehyde.

The aldehyde can be sorbed at room temperature or at any desired temperature such as in a range of −30° C. to 150° C., in a range of −30° C. to 100° C., or in a range of −20° C. to 50° C.

The amount of aldehyde sorbed by the polymeric sorbent at room temperature (e.g., 25° C.) and standard pressure is often at least 0.5 mmoles/gram (i.e., at least 0.5 mmoles of aldehyde per gram of polymeric sorbent). For example, the amount of aldehyde sorbed can be at least 1 mmole/gram, at least 1.5 mmoles/gram, at least 2 mmoles/gram, at least 2.5 mmoles/gram, at least 3 mmoles/gram, at least 3.5 mmoles/gram, at least 4 mmoles/gram, at least 4.5 mmoles/gram, or at least 5 mmoles/gram. The amount sorbed can be up to 12 mmoles/gram or even higher, up to 10 mmoles/gram, up to 9 mmoles/gram, up to 8 mmoles/gram, or up to 7 mmoles/gram. The amount sorbed is often in a range of 0.5 to 12 mmoles/gram, in a range of 1 to 12 mmoles/gram, in a range of 2 to 12 mmoles/gram, in a range of 1 to 10 mmoles/gram, in a range of 2 to 10 mmoles/gram, in a range of 3 to 12 mmoles/gram, in a range of 3 to 10 mmoles/gram, or in a range of 3 to 8 mmoles/gram.

The amount of aldehyde sorbed by the composite granules at room temperature is related to the amount of nitrogen-containing groups incorporated into the polymeric sorbent. The amount of aldehyde sorbed by the composite granules is often at least 0.35 mmoles/gram and can be up to 10 mmoles/gram or even higher. In many embodiments, the amount sorbed is at least 1 mmole/gram, at least 2 mmoles/gram, or at least 3 mmoles/gram. The amount sorbed can be, for example, up to 9 mmoles/gram, up to 8 mmoles/gram, up to 7 mmoles/gram, up to 6 mmoles/gram, or up to 5 mmoles/gram.

Exemplary Embodiments

Various embodiments are provided that are composite granules, a method of preparing composite granules, a method of sorbing aldehyde on composite granules, or composite granules with sorbed aldehyde.

Embodiment 1A is composite granules that include a binder and a polymeric sorbent that is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group (—$NH_2$), or a compound having at least two amino groups of formula —NHR where R is hydrogen or alkyl.

Embodiment 2A is the composite granules of embodiment 1A, wherein the binder comprises metal hydroxides, metal oxides, or combinations thereof.

Embodiment 3A is the composite granules of embodiment 1A, wherein the binder comprises a salt (e.g., a metal salt) or a polymer.

Embodiment 4A is the composite granules of embodiment 1A, wherein the binder comprises a silicate (e.g., a metal silicate).

Embodiment 5A is the composite granules of embodiment 4A, wherein the silicate comprises sodium silicate, potassium silicate, calcium silicate, magnesium silicate, sodium metasilicate, or a mixture thereof.

Embodiment 6A is the composite granules of embodiment 5A, wherein the silicate comprises sodium metasilicate.

Embodiment 7A is the composite granules of embodiment 1A, wherein the binder comprises a polyorganozirconate, polyorganoaluminate, polysiloxane, polysilane, polysilazane, polycarbosilane, polyborosilane, zirconium dimethacrylate, zirconium tetramethacrylate, zirconium 2-ethylhexanoate, aluminum butoxide, aluminum diisopropoxide ethylacetoacetate, tetramethyldisiloxane, tristrimethylsilylphosphate, tristrimethylsiloxyboron, or a mixture thereof.

Embodiment 8A is the composite granules of embodiment 1A, wherein the binder comprises a carboxylate salt.

Embodiment 9A is the composite granules of embodiment 8A, wherein the carboxylate anion has at least 10 carbon atoms.

Embodiment 10A is the composite granules of any one of embodiments 8A or 9A, wherein the carboxylate salt comprises magnesium stearate.

Embodiment 11A is the composite granules of embodiment 1A, wherein the binder comprises a thermoplastic polymer.

Embodiment 12A is the composite granules of embodiment 1A, wherein the binder comprises a thermoset polymer.

Embodiment 13A is the composite granules of embodiment 1A, wherein the binder comprises an elastomer.

Embodiment 14A is the composite granules of embodiment 1A, wherein the binder comprises a naturally occurring polymer.

Embodiment 15A is the composite granules of embodiment 14A, wherein the naturally occurring polymer is a cellulosic resin.

Embodiment 16A is the composite granules of embodiment 1A, wherein the binder comprises an electrically conductive polymer.

Embodiment 17A is the composite granules of embodiment 1A, wherein the binder comprises a gelling material, an absorbent material, or mixture thereof.

Embodiment 18A is the composite granules of embodiment 17A, wherein the binder comprises a superabsorbent material comprising polyacrylic acid, polyacrylamide, polyalcohol, polyamine, polyethylene oxide, cellulose including carboxymethyl cellulose, chitin, gelatin, starch, polyvinyl alcohol, polyacrylonitrile, alginic acid, carrageenan isolated from seaweed, polysaccharide, pectin, xanthan, polydiallyldimethylammonium chloride, polyvinylpyridine, polyvinylbenzyltrimethylammonium salt, polyvinyacetate, polylactic acid, or mixture thereof.

Embodiment 19A is the composite granules of any one of embodiment 1A to 18A, wherein the polymerizable composition comprises 15 to 65 weight percent maleic anhydride, 30 to 85 weight percent divinylbenzene, and 0 to 40 weight percent of a styrene-type monomer.

Embodiment 20A is the composite granules of any one of embodiments 1A to 19A, wherein the polymerizable composition comprises 25 to 65 weight percent maleic anhydride, 30 to 75 weight percent divinylbenzene, and 1 to 20 weight percent styrene-type monomer.

Embodiment 21A is the composite granules of any one of embodiments 1A to 20A, wherein the polymerizable composition comprises 30 to 65 weight percent maleic anhydride, 30 to 70 weight percent divinylbenzene, and 1 to 20 weight percent styrene-type monomer.

Embodiment 22A is the composite granules of any one of embodiments 1A to 21A, wherein the nitrogen-containing compound is of Formula (V), $$R_4NHR_1 \qquad (V)$$

In Formula (V), $R_1$ is hydrogen or an alkyl; $R_4$ is hydrogen, alkyl, a group of formula —$R_5$—$NHR_6$, or —(C=NH)—$NH_2$; $R_5$ is a covalent bond, an alkylene, an arylene, an aralkylene, a heteroalkylene having one or more oxy (—O—) groups, or a heteroalkylene having one or more —NH— groups; and $R_6$ is hydrogen, alkyl, or —(C=NH)—$NH_2$.

Embodiment 23A is the composite granules of embodiment 22A, wherein the nitrogen-containing compound of Formula (V) has a molecular weight no greater than 2000 Daltons.

Embodiment 24A is the polymeric sorbent of embodiment 22A or 23A, wherein the nitrogen-containing compound of Formula (V) is of Formula (V-1).

$$R_6HN—R_5—NHR_1 \qquad (V-1)$$

In Formula (V-1), $R_1$ is hydrogen or an alkyl; $R_5$ is a covalent bond, an alkylene, an arylene, an aralkylene, a heteroalkylene having one or more oxy (—O—) groups, or a heteroalkylene having one or more —NH— groups; and $R_6$ is hydrogen, alkyl, or —(C=NH)—$NH_2$.

Embodiment 25A is the polymeric sorbent of embodiment 22A or 23A, wherein $R_5$ is a heteroalkylene and the nitrogen-containing compound is of Formula (V-2) or Formula (V-3).

$$R_6HN—R_a—[O—R_b]_n—NHR_1 \qquad (V-2)$$

$$R_6HN—R_a—[NH—R_b]_n—NHR_1 \qquad (V-3)$$

In these formulas, $R_a$ is an alkylene; $R_b$ is an alkylene; and n is an integer in a range of 1 to 50.

Embodiment 26A is the polymeric sorbent of embodiment 24A, wherein the nitrogen-containing compound of Formula (V-1) is of Formula (V-4)

$$NH_2—(C=NH)—HN—R_5—NHR_1 \qquad (V-4)$$

wherein $R_5$ is an alkylene.

Embodiment 27A is the polymeric sorbent of embodiment 22A or 23A, wherein the nitrogen-containing compound of Formula (V) is of Formula (V-5).

$$H_2N—(C=NH)—NHR_1 \qquad (V-5)$$

Embodiment 28A is the composite granules of any one of embodiments 1A to 21A, wherein the nitrogen-containing compound is of Formula (VI)

$$R_7—(NHR_1)_z \qquad (VI)$$

wherein $R_7$ is a z-valent radical of an alkane or a z-valent radical of a heteroalkane; and z is an integer in a range of 3 to 10.

Embodiment 29A is the composite granules of any one of embodiments 1A to 28A, wherein the polymeric sorbent further comprises an acid-base colorimetric indicator.

Embodiment 30A is the composite granules of embodiment 29A, wherein the acid-base colorimetric indicator has a lower $pK_b$ than the nitrogen-containing compound.

Embodiment 31A is the composite granules of embodiment 28A or 29A, wherein the difference between the $pK_b$ of the nitrogen-containing compound and the $pK_b$ of the acid-based indicator is equal to at least 2.

Embodiment 32A is the composite granules of any one of embodiments 1A to 31A, wherein the polymeric sorbent has a BET specific surface area equal to at least 25 $m^2$/gram.

Embodiment 33A is the composite granules of any one of embodiments 1A to 32A, wherein the composite granules comprise 1 to 30 weight percent binder and 70 to 99 weight percent polymeric sorbent based on the total weight of the composite granules.

Embodiment 34A is the composite granules of any one of embodiments 1A to 32A, wherein the composite granules comprise 1 to 25 weight percent binder and 75 to 99 weight percent polymeric sorbent based on the total weight of the composite granules.

Embodiment 35A is the composite granules of any one of embodiments 1A to 32A, wherein the composite granules comprise 1 to 20 weight percent binder and 80 to 99 weight percent polymeric sorbent based on the total weight of the composite granules.

Embodiment 1B is a method of sorbing (i.e., capturing) an aldehyde. The method includes providing composite granules that contain a binder and a polymeric sorbent. The polymeric sorbent is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group (—$NH_2$), or a compound having at least two amino groups of formula —NHR where R is hydrogen or alkyl. The method further includes exposing the composite granules to an aldehyde and sorbing the aldehyde on the polymeric sorbent. The aldehyde is of Formula (I)

$$R_2-(CO)-H \qquad (I)$$

where $R_2$ is hydrogen, alkyl, vinyl, or aryl. The molecular weight of the aldehyde of Formula (I) is typically no greater than 200 grams/mole.

Embodiment 2B is the method of embodiment 1B, wherein the composite granule is any one of embodiments 2A to 35A.

Embodiment 3B is the method of embodiment 1B or 2B, wherein $R_2$ is hydrogen or methyl.

Embodiment 4B is the method of any one of embodiments 1B to 3B, wherein the polymeric sorbent sorbs an amount of aldehyde in a range of 0.35 to 10 millimoles per gram based on the weight of the composite granules.

Embodiment 5B is the method of any one of embodiments 1B to 4B, wherein the polymeric sorbent further comprises an acid-base colorimetric indicator and wherein the acid-base colorimetric indicator changes color when the aldehyde sorption capacity of the polymeric sorbent is reached or is close to being reached.

Embodiment 1C is a composition comprising a reaction product of an aldehyde and a composite granule that contains a binder and a polymeric sorbent. The polymeric sorbent is a reaction product of (a) a precursor polymeric material and (b) a nitrogen-containing compound. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The nitrogen-containing compound is selected from ammonia, a compound having a single primary amino group (—NH$_2$), or a compound having at least two amino groups of formula —NHR where R is hydrogen or alkyl. The aldehyde is of Formula (I)

$$R_2-(CO)-H \qquad (I)$$

where $R_2$ is hydrogen, alkyl, vinyl, or aryl. The molecular weight of the aldehyde of Formula (I) is typically no greater than 200 grams/mole.

Embodiment 2C is the composition of embodiment 1C, wherein the composite granule is any one of embodiments 2A to 35A.

Embodiment 3C is the composition of embodiment 1C or 2C, wherein $R_2$ is hydrogen or methyl.

Embodiment 4C is the composition of any one of embodiments 1C to 3C, wherein the polymeric sorbent sorbs an amount of aldehyde in a range of 0.35 to 10 millimoles per gram based on the weight of the composite granules.

Embodiment 1D is a method of preparing composite granules. The method includes providing a precursor polymeric material. The precursor polymeric material comprises a polymerized product of a polymerizable composition containing (1) 8 to 65 weight percent maleic anhydride based on the total weight of monomers in the polymerizable composition, (2) 30 to 85 weight percent divinylbenzene based on the total weight of monomers in the polymerizable composition, and (3) 0 to 40 weight percent of a styrene-type monomer based on the total weight of monomers in the polymerizable composition, wherein the styrene-type monomer is styrene, an alkyl-substituted styrene, or a combination thereof. The method further includes reacting the precursor polymeric material with a nitrogen-containing compound that is selected from ammonia, a compound having a single primary amino group (—NH$_2$), or a compound having at least two amino groups of formula —NHR where R is hydrogen or alkyl. The reaction results in the formation of the polymeric sorbent having a covalently attached nitrogen-containing group. The method still further includes blending the polymeric sorbent with a binder to form a blended material and preparing the composite granules from the blended material.

Embodiment 2D is the method of embodiment 1D, wherein the polymeric sorbent is any one of embodiments 2A to 35A.

Embodiment 3D is the method of embodiment 1D or 2D, wherein preparing the composite granules comprises forming pellets or disks from the blended material, milling the pellets or disks to form a milled product, and sieving the milled product to collect a sieved product.

EXAMPLES

Materials

The materials with their sources were as listed in Table 1. Unless otherwise indicated, all materials were purchased from commercial sources and used as received.

TABLE 1

Materials List

| Designation | Description |
|---|---|
| DVB | Divinylbenzene (80% technical grade) containing 80 weight percent DVB and 20 weight percent styrene-type monomers that is available from Sigma-Aldrich, Milwaukee, WI, USA. The calculation of moles of DVB used to prepare the polymeric material does take into account the DVB purity. |
| MA | Maleic anhydride, which is available from Alfa Aesar, Ward Hill, MA, USA. |
| VAZO 52 | 2,2'-azobis(2,4-dimethyl-pentanenitrile), which is available under the trade name VAZO 52 from E. I. du Pont Nemours, Wilmington, DE, USA. |
| EtOAc | Ethyl acetate, which is available from EMD Millipore Corporation, Billerica, MA, USA. |
| EtOH | Ethyl alcohol (denatured), which is available from EMD Millipore Corporation, Billerica, MA, USA. |

TABLE 1-continued

Materials List

| Designation | Description |
|---|---|
| EDA | Ethylenediamine (99%), which is available from Alfa Aesar, Ward Hill, MA, USA. |
| ME50-HPMC | Hydroxypropyl methylcellulose (HPMC) available under the trade name METHOCEL E50 from Dow Chemical Company, Midland, MI, USA. |
| MgSt | Magnesium stearate, which is available from Alfa Aesar, Ward Hill, MA, USA. |
| $Na_2SiO_3$ | Sodium metasilicate (anhydrous, 18 mesh granular), which is available from Alfa Aesar, Ward Hill, MA, USA. |

Gas Sorption Analysis

Porosity and gas sorption experiments were performed using an Accelerated Surface Area and Porosimetry (ASAP) 2020 system from Micromeritics Instrument Corporation (Norcross, Ga.). The adsorbates were of ultra-high purity. The following is a typical method used for the characterization of the porosity within the exemplified materials. In a Micromeritics half inch (1.3 centimeters (cm)) diameter sample tube, 50-250 milligrams of material was degassed by heating under ultra-high vacuum (3-7 micrometers Hg) on the analysis port of the ASAP 2020 to remove residual solvent and other adsorbates. The degas procedure for the precursor polymeric material was 3 hours at 150° C.

Argon sorption isotherms at 77 K for the precursor polymeric material were obtained using low pressure dosing (5 centimeters³/gram ($cm^3/g$)) at a relative pressure (p/p°) less than 0.1 and a pressure table of linearly spaced pressure points from a p/p° in a range from 0.1 to 0.98. The method for all isotherms made use of the following equilibrium intervals: 90 seconds at p/p° less than $10^{-5}$, 40 seconds at p/p° in a range of $10^{-5}$ to 0.1, and 20 seconds at p/p° greater than 0.1. Helium was used for the free space determination, after argon sorption analysis, both at ambient temperature and at 77 K. BET specific surface areas ($SA_{BET}$) were calculated from argon adsorption data by multipoint Brunauer-Emmett-Teller (BET) analysis. Apparent micropore distributions were calculated from argon adsorption data by density functional theory (DFT) analysis using the argon at 77 K on carbon slit pores by non-linear density functional theory (NLDFT) model. Total pore volume was calculated from the total amount of argon adsorbed at a p/p° equal to approximately 0.98. BET, DFT, and total pore volume analyses were performed using Micromeritics MicroActive Version 4.00 software.

Formaldehyde Capacity Test

A simple flow-through custom built delivery system was used to deliver known concentrations of formaldehyde to the sample for measurement. Plastic tubing was used throughout the delivery system, with the portions downstream of the formaldehyde generation being fluoropolymer tubing. Formaldehyde was generated by delivering a 4.86 weight percent solution of paraformaldehyde in water using a 2.5 milliliter (mL) GASTIGHT syringe (product number 81420, Hamilton Company, Reno, Nev.). This syringe was driven at a specific rate by a syringe pump, model 780200-V (KD Scientific, Holliston, Mass.). By knowing the paraformaldehyde concentration in solution, and the cross-sectional area of the syringe, a precise rate of paraformaldehyde solution could be delivered. This solution was delivered onto a piece of hot gold foil in a flask which served to decompose the paraformaldehyde and vaporize the resulting formaldehyde. Through this flask, 250 mL/min of nitrogen gas was passed, controlled by an analog mass flow controller, model GFC17, with a range of 0-500 mL/min (Aalborg, Orangeburg, N.Y.). This controller was calibrated by placing a model 800286 GILIBRATOR soap bubble flow meter with a 20-6000 mL calibration cell (Sensidyne, St. Petersburg, Fla.) at the output of the controller. The GILIBRATOR flow meter was used to measure a range of flows from each flow controller that was used to generate calibration curves. The evaporation of the formaldehyde served to create a 250 parts per million (ppm) concentration of formaldehyde in the nitrogen. Water was also evaporated into the nitrogen which humidified the stream to approximately 50% relative humidity. Using these calibration curves, the mass flow controllers were set to deliver the desired formaldehyde concentration and humidity at the desired gas flow rate.

The formaldehyde removal capacity for a test material was determined by adding sieved particles of a test material to a tared test tube until the bed depth in the tube was 1.0 cm after being tamped. The inner diameter of the test tube was 1.0 cm. The mass of the test material was then determined by weighing the test materials in the test tube. The test tube was then connected in line with the system, allowing the 250 ppm formaldehyde gas stream to flow through the test material. To the downstream side of the test tube, tubing was connected that led to a gas chromatograph instrument (SRI 8610C, SRI Instruments, Torrance, Calif.). At the time the formaldehyde gas stream began to pass though the test sample, the test was considered started, and a timer was started. The gas chromatograph periodically sampled the gas stream, recording the timestamp of every data point taken, and passed the sample through a RT-U-BOND 30 meter column (Restek Corporation, Bellefonte, Pa.).

The effluent from this column was then passed through a methanizer equipped with a flame ionization detector (FID). The methanizer converted the formaldehyde to methane, which was then ionized and detected by the FID. The signal was subsequently reported and recorded in the data acquisition software provided with the device. Good formaldehyde vapor detection occurred when the gas chromatograph sampled the gas stream for 6 seconds, allowed the sample to pass through the column for 144 seconds, and then flushed out the sample of the gas stream for 60 seconds before it drew in the next sample of the gas stream to be analyzed.

Prior to testing, different rates of formaldehyde were delivered into the nitrogen gas stream to calibrate the gas chromatograph software. In this way, a signal to concentration curve could be made so that any level of signal on the gas chromatograph could be correlated to a concentration of formaldehyde.

The end point of the formaldehyde capacity test was defined as the point corresponding to the time at which the formaldehyde effluent passing through the bed of test material produced a signal on the FID detector that exceeded the signal corresponding to 1 ppm. The performance of each test material was reported as the number of minutes until 1 ppm breakthrough was observed performing the test as described above. In addition, the area under the curve of the breakthrough plot until 1 ppm breakthrough coupled with the known mass of the test material used in this fixed volume test was used to calculate a millimole/gram (mmol/g) capacity for each test material using a sum of least squares equation.

Preparatory Example 1: Preparation of Precursor Polymeric Material

In a 2 liter (L) Parr stainless steel pressure vessel, 177.11 g (1.09 mol) divinylbenzene, 240.05 g (2.45 mol) of maleic anhydride (MA), and 4.17 g (16.8 mmol) of VAZO 52 was dissolved in 625.92 g of ethyl acetate (EtOAc). The polymerizable composition had 40.0 weight percent solids in EtOAc and contained a monomer mixture (34.0 weight percent DVB, 57.5 weight percent MA, and 8.5 weight percent styrene-type monomers) and 1 weight percent VAZO 52 (based on total weight of monomers). The polymerizable composition was bubbled with nitrogen for 15 minutes. The pressure vessel was then sealed and placed in a water bath at 60° C. The polymerizable composition was heated at this elevated temperature for 18 hours. A white precipitate that formed was isolated by vacuum filtration and washed with EtOAc. The solid was placed in a 4 L Erlenmeyer flask and 2.0 L of EtOAc was added to the flask. The solid was allowed to stand in EtOAc for one hour at room temperature. The solid was again isolated by vacuum filtration and washed with EtOAc. The solid was again placed in a 4 L Erlenmeyer flask and 2.0 L of EtOAc was added to the flask. The solid was allowed to stand in EtOAc overnight. The solid was again isolated by vacuum filtration and washed with EtOAc. The solid was then dried in a batch oven at 100° C. for 18 hours. This precursor polymeric material had a $SA_{BET}$ of 320.8 meters$^2$/gram (m$^2$/g) and a total pore volume of 0.250 cm$^3$/g (p/p° equal to 0.977) as determined by argon adsorption.

Preparatory Example 2: Preparation of Polymeric Sorbent

The precursor polymeric material described in Preparatory Example 1 was treated with ethylenediamine (EDA). More specifically, 57 mL (854 mmol) of EDA was combined with 230 mL of ethyl alcohol (EtOH) within a 1 L jar. To this mixture was added 35 g of the above precursor polymeric material which had been sieved to a particle size range of 120×170 mesh by isolation utilizing USA standard test No. 120 and 170 wire mesh sieves (ASTM E-11 standard; Hogentogler and Co., Inc., Columbia, Md.) and a Meinzer II Sieve Shaker (CSC Scientific Company, Inc., Fairfax, Va.) operated for 15 minutes before the separated material was collected.

The jar was then capped and placed in a sand bath at 80° C. This suspension was heated at this elevated temperature for 18 hours. The solid was isolated by vacuum filtration and washed with EtOH. The solid was then placed in an 8 ounce (oz.) jar, and 100 mL of EtOH was added. The solid was allowed to stand in the EtOH for 4 hours. The solid was again isolated by vacuum filtration and washed with EtOH. The solid was then dried under vacuum in an oven at 120° C. for 4 hours.

Examples 1-6

Samples for Examples 1-6 were prepared by combining, within a 20 mL vial, 1.25 g of polymeric sorbent prepared in Preparatory Example 2 with the following types and amounts of binders listed in Table 2.

TABLE 2

List of binder types and amounts for Examples 1-6

| Example | Binder Type | Binder Amount (parts per hundred polymeric sorbent) | Binder Amount (g) |
| --- | --- | --- | --- |
| 1 | ME50-HPMC | 5 | 0.0625 |
| 2 | ME50-HPMC | 10 | 0.125 |
| 3 | MgSt | 5 | 0.0625 |
| 4 | MgSt | 10 | 0.125 |
| 5 | Na$_2$SiO$_3$ | 5 | 0.0625 |
| 6 | Na$_2$SiO$_3$ | 10 | 0.125 |

Each sample was then added, individually, to a 25 mm inner diameter pellet die by Carver, Inc. (Wabash, Ind.). The pellet die was then placed between the 2 platens of a benchtop heated press with a 230 volt temperature controller, model 4389, by Carver, Inc. (Wabash, Ind.). The samples were then compacted, one at a time, at a pressure of 38,000 pounds per square inch (psi) and a temperature of 100° C. for 5 minutes using the benchtop press.

The samples were then ejected from the pellet die using the benchtop press. Once ejected, the now compacted tablet of material was broken up and milled down using a rotary hammer mill with a 2.0 mm sieve screen by IKA (Wilmington, N.C.). The broken up material was then sieved to isolate all material that was less than 40 mesh by utilizing a USA standard test No. 40 wire mesh sieve (ASTM E-11 standard; Hogentogler and Co., Inc., Columbia, Md.) and a Meinzer II Sieve Shaker (CSC Scientific Company, Inc., Fairfax, Va.) operated for 15 minutes before the separated material was collected. The material less than 40 mesh was collected in a new clean 20 mL vial. Table 3 lists how much material was recovered after sieving and the yield for Examples 1-6. After being sieved, the samples were dried again under high vacuum in an oven at 90° C. overnight. The remaining fine material (40 mesh and greater material) could be pressed again into pellets, ground and sieved to eventually yield nearly 100% composite granules.

TABLE 3

List of recovered material less than 40 mesh and yield for Examples 1-6

| Example | <40 Mesh Recovered (g) | <40 Mesh Yield (%) |
| --- | --- | --- |
| 1 | 0.53 | 45.7 |
| 2 | 0.48 | 40.3 |
| 3 | 0.33 | 31.4 |
| 4 | 0.35 | 31.2 |
| 5 | 0.48 | 46.6 |
| 6 | 0.53 | 44.2 |

The composite granules (less than 40 mesh material) were used to perform the formaldehyde capacity test, as described above, to determine the formaldehyde capacity of the composite granules of Examples 1-6. The number of minutes each test lasted and the calculated mmol/g capacity can be found in Table 4 for Examples 1-6.

TABLE 4

Tabulated formaldehyde flow testing results

| Example | Binder | Binder Loading (parts per hundred polymeric sorbent) | Minutes until 1 ppm Breakthrough | Capacity (mmol/g) |
|---|---|---|---|---|
| 1 | ME50-HPMC | 5 | 1111 | 7.18 |
| 2 | ME50-HPMC | 10 | 860 | 6.51 |
| 3 | MgSt | 5 | 656 | 5.71 |
| 4 | MgSt | 10 | 665 | 5.55 |
| 5 | $Na_2SiO_3$ | 5 | 811 | 5.75 |
| 6 | $Na_2SiO_3$ | 10 | 571 | 3.98 |

What is claimed is:

1. Composite granules comprising:
a polymeric sorbent comprising a reaction product of
   (a) a precursor polymeric material comprising a free radical polymerization product of a polymerizable composition comprising
      (1) 20 to 65 weight percent maleic anhydride based on the total weight of monomers in the polymerizable composition;
      (2) 30 to 85 weight percent divinylbenzene based on the total weight of monomers in the polymerizable composition; and
      (3) 0 to 40 weight percent of a styrene-type monomer based on the total weight of monomers in the polymerizable composition, wherein the styrene-type monomer is styrene, an alkyl-substituted styrene, or a combination thereof; and
      (4) a free radical initiator; and
   (b) a nitrogen-containing compound that is selected from ammonia, a compound having a single primary amino group (—$NH_2$), or a compound having at least two amino groups of formula —NHR where R is hydrogen or alkyl; and
a binder, wherein the binder is blended with particles of the polymeric sorbent and wherein multiple particles of the polymeric sorbent are held together by the binder in the composite granules.

2. The composite granules of claim 1, wherein the amount of the binder is in a range of 1 to 30 weight percent based on the weight of the composite granules.

3. The composite of claim 1, wherein the binder comprises a salt or a polymeric material.

4. The composite granules of claim 3, wherein the binder comprises a silicate salt.

5. The composite granules of claim 3, wherein the binder comprises a carboxylate salt, wherein the carboxylate salt has 10 to 20 carbon atoms.

6. The composite granules of claim 3, wherein the binder comprises a naturally occurring polymer.

7. The composite granules of claim 3, wherein the binder comprises a cellulosic resin.

8. The composite granules of claim 1, wherein the nitrogen-containing compound is of Formula (V)

$$R_4NHR_1 \qquad (V)$$

wherein
$R_1$ is hydrogen or an alkyl;
$R_4$ is hydrogen, an alkyl, a group of formula —$R_5$—$NHR_6$, or —(C=NH)—$NH_2$;
$R_5$ is a covalent bond, an alkylene, an arylene, an aralkylene, a heteroalkylene having one or more oxy (—O—) groups, or a heteroalkylene having one or more —NH— groups; and
$R_6$ is hydrogen, an alkyl, or —(C=NH)—$NH_2$.

9. The composite granules of claim 1, wherein the nitrogen-containing compound is of Formula (VI)

$$R_7-(NHR_1)_z \qquad (VI)$$

wherein
$R_1$ is hydrogen or an alkyl;
$R_7$ is a z-valent radical of an alkane or a z-valent radical of a heteroalkane; and
z is an integer in a range of 3 to 10.

10. The composite granules of claim 1, wherein the polymeric sorbent further comprises an acid-base colorimetric indicator.

11. The composite granules of claim 1, wherein the polymeric sorbent has a BET surface area equal to at least 25 $m^2$/gram.

12. A method of sorbing an aldehyde, the method comprising:
providing composite granules comprising a binder and a polymeric sorbent according to claim 1; and
exposing the composite granules to the aldehyde; and
sorbing the aldehyde on the polymeric sorbent, the aldehyde being of Formula (I)

$$R_2-(CO)-H \qquad (I)$$

wherein
$R_2$ is hydrogen, alkyl, vinyl, or aryl; and
the molecular weight of the aldehyde of Formula (I) is no greater than 200 grams/mole.

13. The method of claim 12, wherein $R_2$ is hydrogen or methyl.

14. The method of claim 12, wherein the polymeric sorbent sorbs an amount of aldehyde in a range of 0.35 to 10 millimoles per gram based on the weight of the composite granules.

15. The method of claim 12, wherein the polymeric sorbent comprises an acid-base indicator and wherein the acid-base indicator changes color when the aldehyde sorption capacity of the polymeric sorbent is reached or is close to being reached.

* * * * *